(12) United States Patent
Asadi-Zanjani et al.

(10) Patent No.: US 11,520,967 B2
(45) Date of Patent: Dec. 6, 2022

(54) TECHNIQUES FOR PRINTED CIRCUIT BOARD COMPONENT DETECTION

(71) Applicant: UNIVERSITY OF FLORIDA RESEARCH FOUNDATION, INCORPORATED, Gainesville, FL (US)

(72) Inventors: Navid Asadi-Zanjani, Gainesville, FL (US); Nathan Jessurun, Gainesville, FL (US); Mark M. Tehranipoor, Gainesville, FL (US); Olivia Pauline Paradis, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 174 days.

(21) Appl. No.: 17/168,529

(22) Filed: Feb. 5, 2021

(65) Prior Publication Data
US 2021/0256188 A1    Aug. 19, 2021

Related U.S. Application Data

(60) Provisional application No. 62/976,754, filed on Feb. 14, 2020.

(51) Int. Cl.
*G06T 7/00* (2017.01)
*G06T 7/11* (2017.01)
(Continued)

(52) U.S. Cl.
CPC .......... *G06F 30/392* (2020.01); *G06T 7/0006* (2013.01); *G06T 7/0008* (2013.01);
(Continued)

(58) Field of Classification Search
CPC .... G06F 30/392; G06F 30/33; G06F 2115/12; G06T 7/0006; G06T 7/0008; G06T 7/11;
(Continued)

(56) References Cited

U.S. PATENT DOCUMENTS

2019/0141837 A1*  5/2019  Schneider ............ H05K 3/0005

OTHER PUBLICATIONS

Chen, Rui. "A PCB Image Self-adaption Threshold Segmentation Method Fusing Color Information and OTSU Theory." 2019 IEEE 8th Joint International Information Technology and Artificial Intelligence Conference (ITAIC). IEEE, 2019. (Year: 2019).*

* cited by examiner

*Primary Examiner* — Amandeep Saini
(74) *Attorney, Agent, or Firm* — Alston & Bird LLP

(57) ABSTRACT

There is a need for more effective and efficient printed circuit board (PCB) design. This need can be addressed by, for example, solutions for performing automated PCB component estimation. In one example, a method includes identifying a plurality of initial component estimations for the PCB; performing a shadow detection segmentation using the plurality of initial component estimations, a non-direct-lighting image, and one or more direct-lighting images to generate a first set of detected PCB components; performing a super-pixel segmentation using the plurality of initial component estimations and the non-direct-lighting-image to generate a second set of detected PCB components; and generating a bill of materials for the PCB based at least in part on the first set of detected PCB components and the second set of detected PCB components.

20 Claims, 17 Drawing Sheets

(51) Int. Cl.
*G06V 10/26* (2022.01)
*G06F 30/392* (2020.01)
*H05K 3/00* (2006.01)

(52) U.S. Cl.
CPC .............. *G06T 7/11* (2017.01); *G06V 10/26* (2022.01); *H05K 3/0005* (2013.01); *G06T 2207/30141* (2013.01)

(58) Field of Classification Search
CPC .......... G06T 2207/30141; G06V 10/26; H05K 3/0005; H05K 3/00
USPC ......................................................... 382/145
See application file for complete search history.

TECHNIQUES FOR PRINTED CIRCUIT BOARD COMPONENT DETECTION

CROSS-REFERENCE TO RELATED APPLICATIONS

This application claims the benefit of U.S. Provisional Patent Application Ser. No. 62/976,754, filed Feb. 14, 2020, which is incorporated herein by reference in its entirety, including any figures, tables, and drawings.

SUPPORT STATEMENTS

This invention was made with government support under FA8650-18-F-1613 awarded by the U.S. Air Force. The government has certain rights in the invention. This invention was made in whole or in part with funds received by Edaptive Computing, Inc.

BACKGROUND

Various embodiments of the present invention address technical challenges related to automated detection of printed circuit board (PCB) components. Various embodiments of the present invention disclose innovative techniques for detecting PCB components, generating bills of materials for PCBs, and designing manufacturing process of PCBs.

BRIEF SUMMARY

In general, embodiments of the present invention provide methods, apparatus, systems, computing devices, computing entities, and/or the like for automated detection of PCB components. Various embodiments of the present invention disclose techniques for automated detection of PCB components that utilize at least one of shadow detection segmentation or super-pixel segmentation.

In accordance with one aspect, a method is provided. In one embodiment, the method comprises identifying a plurality of initial component estimations for a PCB; performing a shadow detection segmentation using the plurality of initial component estimations, the non-direct-lighting image, and the one or more direct-lighting images to generate a first set of detected PCB components; performing a super-pixel segmentation using the plurality of initial component estimations and the non-direct-lighting-image to generate a second set of detected PCB components; and generating a bill of materials for the PCB based at least in part on the first set of detected PCB components and the second set of detected PCB components.

In accordance with another aspect, a computer program product is provided. The computer program product may comprise at least one computer-readable storage medium having computer-readable program code portions stored therein, the computer-readable program code portions comprising executable portions configured to identify a plurality of initial component estimations for a PCB; perform a shadow detection segmentation using the plurality of initial component estimations, the non-direct-lighting image, and the one or more direct-lighting images to generate a first set of detected PCB components; perform a super-pixel segmentation using the plurality of initial component estimations and the non-direct-lighting-image to generate a second set of detected PCB components; and generate a bill of materials for the PCB based at least in part on the first set of detected PCB components and the second set of detected PCB components.

In accordance with yet another aspect, an apparatus comprising at least one processor and at least one memory including computer program code is provided. In one embodiment, the at least one memory and the computer program code may be configured to, with the processor, cause the apparatus to identify a plurality of initial component estimations for a PCB; perform a shadow detection segmentation using the plurality of initial component estimations, the non-direct-lighting image, and the one or more direct-lighting images to generate a first set of detected PCB components; perform a super-pixel segmentation using the plurality of initial component estimations and the non-direct-lighting-image to generate a second set of detected PCB components; and generate a bill of materials for the PCB based at least in part on the first set of detected PCB components and the second set of detected PCB components.

In particular embodiments, the shadow detection segmentation may be performed by determining, based at least in part on comparing the non-direct-lighting image and the one or more direct-lighting images, a shadow detection object indicating presence of one or more shadows in the one or more direct-lighting images. In addition, a validation score may be determined for each initial component estimation of the plurality of initial component estimations based at least in part on a count of the shadow detection object indicating presence of one or more shadows that correspond to the initial component estimation. Accordingly, the first set of detected PCB components may be generated based at least in part on each validation score for an initial component estimation of the plurality of initial component estimations.

In some embodiments, a per-pixel shadow detection may be determined for each direct-lighting pixel of one or more direct-lighting pixels based at least in part on comparing a first darkness of the direct-lighting pixel and a second darkness of a corresponding non-direct-lighting pixel of one or more non-direct-lighting pixels for the direct-lighting pixel in which each direct-lighting image comprises the one or more direct-lighting pixels and the non-direct-lighting image comprises one or more non-direct-lighting pixels. Here, a per-image shadow detection object may be determined for each direct-lighting image based at least in part on each per-pixel shadow detection for a direct-lighting pixel of the one or more direct-lighting pixels of the direct-lighting image, and the shadow detection object may be determined based at least in part on each per-image shadow detection object for a direct-lighting image of the one or more direct-lighting images.

Accordingly, in particular embodiments, the validation score for an initial component estimation may be determined for each direct-lighting image by determining a per-image shadow detection object for the direct-lighting image based at least in part on the shadow detection object. Here, a component coverage region may be determined for the initial component estimation within the direct-lighting image, as well as a light source origination location and a light source travel direction within the direct-lighting image. A farthest distance location may then be determined from the light source origination within the component coverage region and a determination may be made as to whether the per-image shadow detection object indicates presence of a qualified shadow for the initial component estimation within a distance threshold of the farthest distance location in the light source travel direction. In response to determining that the per-image shadow detection object indicates presence of the qualified shadow for the initial component estimation, the validation score of the initial component estimation may be increased.

In other embodiments, the validation score for an initial component estimation may be determined for each direct-lighting image by determining a per-image shadow detection object for the direct-lighting image based at least in part on the shadow detection object. Here, a component coverage region may be determined for the initial component estimation within the direct-lighting image, wherein the component coverage region is based at least in part on the initial component estimation plus a distance within the initial component estimation. Accordingly, a line normal to a light source direction for the direct-lighting image may be determined, as well as an origin of the component associated with the initial component estimation within the direct-lighting image. A determination may then be made as to whether the per-image shadow detection object indicates presence of a qualified shadow within the component coverage region for the initial component estimation based at least in part on the line normal to the light source direction and the origin of the component. In response to determining that the per-image shadow detection object indicates presence of the qualified shadow for the initial component estimation, the validation score of initial component estimation may be increased.

In various embodiments, the first set of detected PCB components is generated by determining a validation score threshold based at least in part on a count of the one or more direct-lighting images and making a validation determination for each initial component estimation of the plurality of initial component estimations based at least in part on whether the validation score for the initial component estimation satisfies the validation score threshold. Accordingly, the first set of detected PCB components is generated based at least in part on each validation determination for an initial component estimation of the plurality of initial component estimations.

Further, in various embodiments, the super-pixel segmentation is performed by determining one or more per-pixel features for each pixel of the one or more pixels of the non-direct-lighting image and determining one or more super-pixels comprising a corresponding subset of the one or more pixels within the non-direct-lighting image based at least in part on the one or more per-pixel features of each pixel of the one or more pixels. Here, in particular embodiments, the second set of detected PCB components is generated based at least in part on the one or more super-pixels. In some embodiments, the one or more super-pixels are determined by initializing each pixel of the one or more pixels of the non-direct-lighting image as a super-pixel, performing, until a clustering convergence condition is satisfied, clustering iterations on the one or more pixels based at least in part on the one or more per-pixel features of each pixel of the one or more pixels to generate one or more pixel clusters, and determining the one or more super-pixels based at least in part on the one or more pixel clusters.

BRIEF DESCRIPTION OF THE DRAWINGS

Figure 1A:
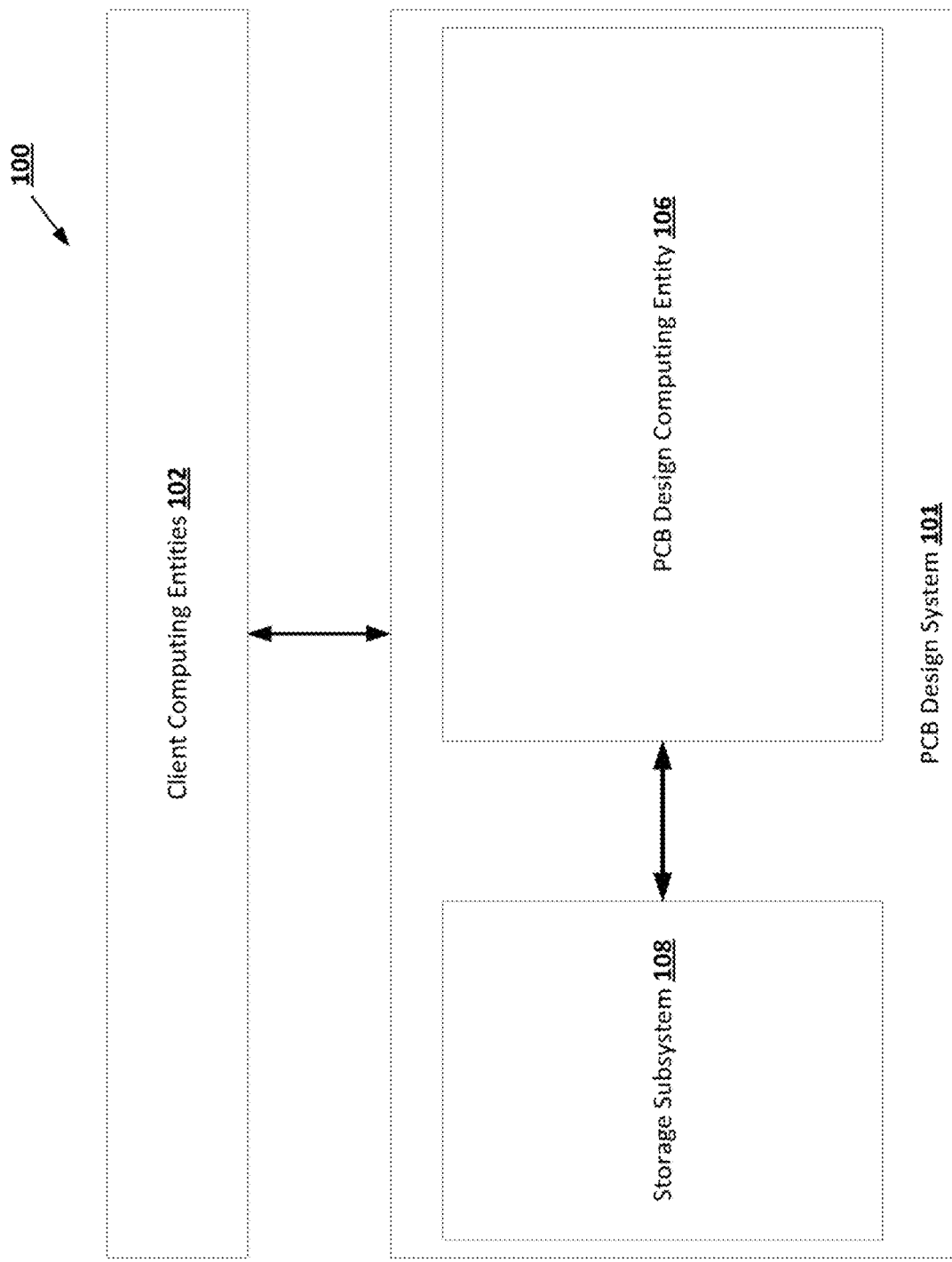

Having thus described the invention in general terms, reference will now be made to the accompanying drawings, which are not necessarily drawn to scale, and wherein:

FIG. 1A provides an exemplary overview of a hardware architecture that can be used to practice embodiments of the present invention.

Figure 1B:
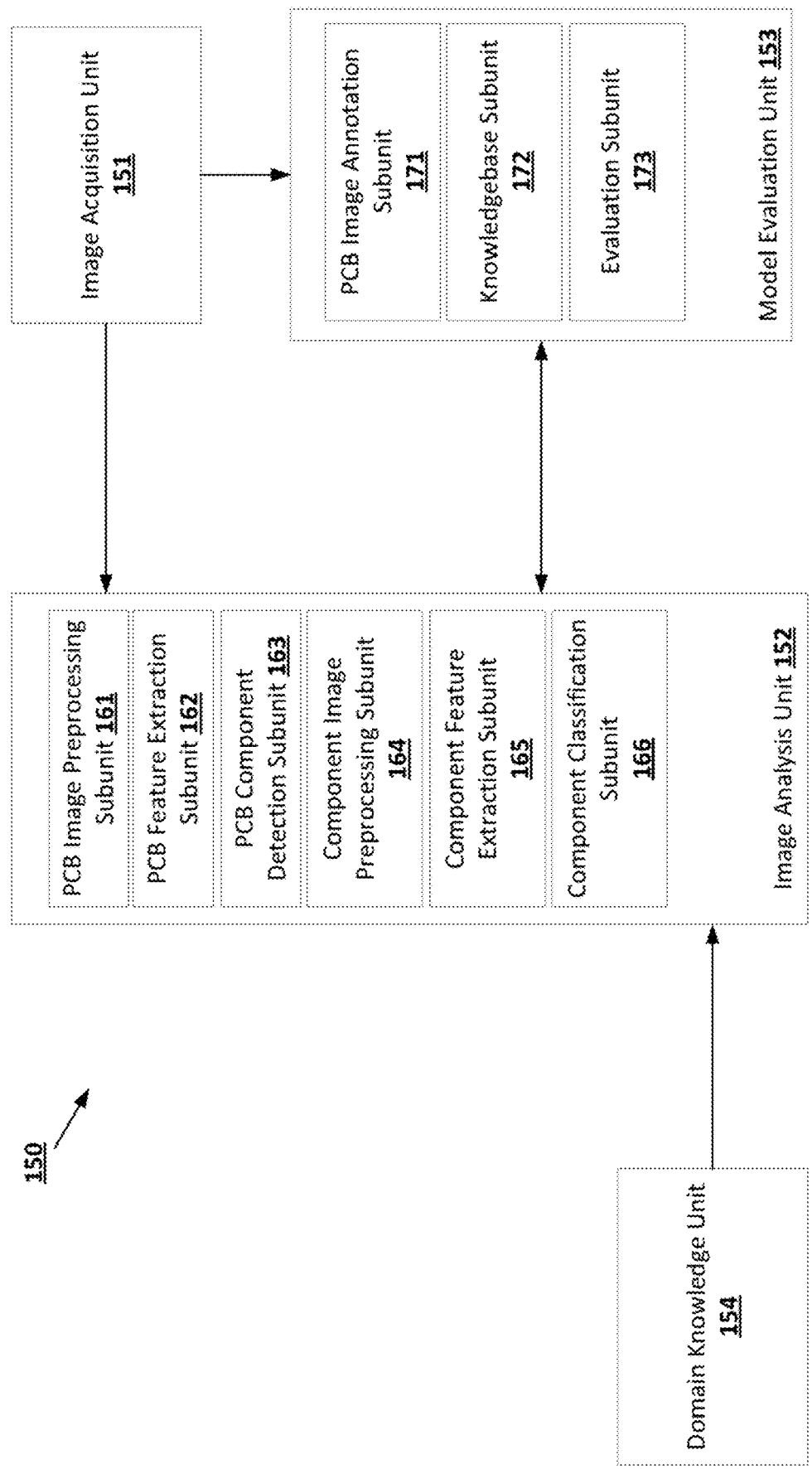

FIG. 1B provides an exemplary overview of a software architecture that can be used to practice embodiments of the present invention.

Figure 2:
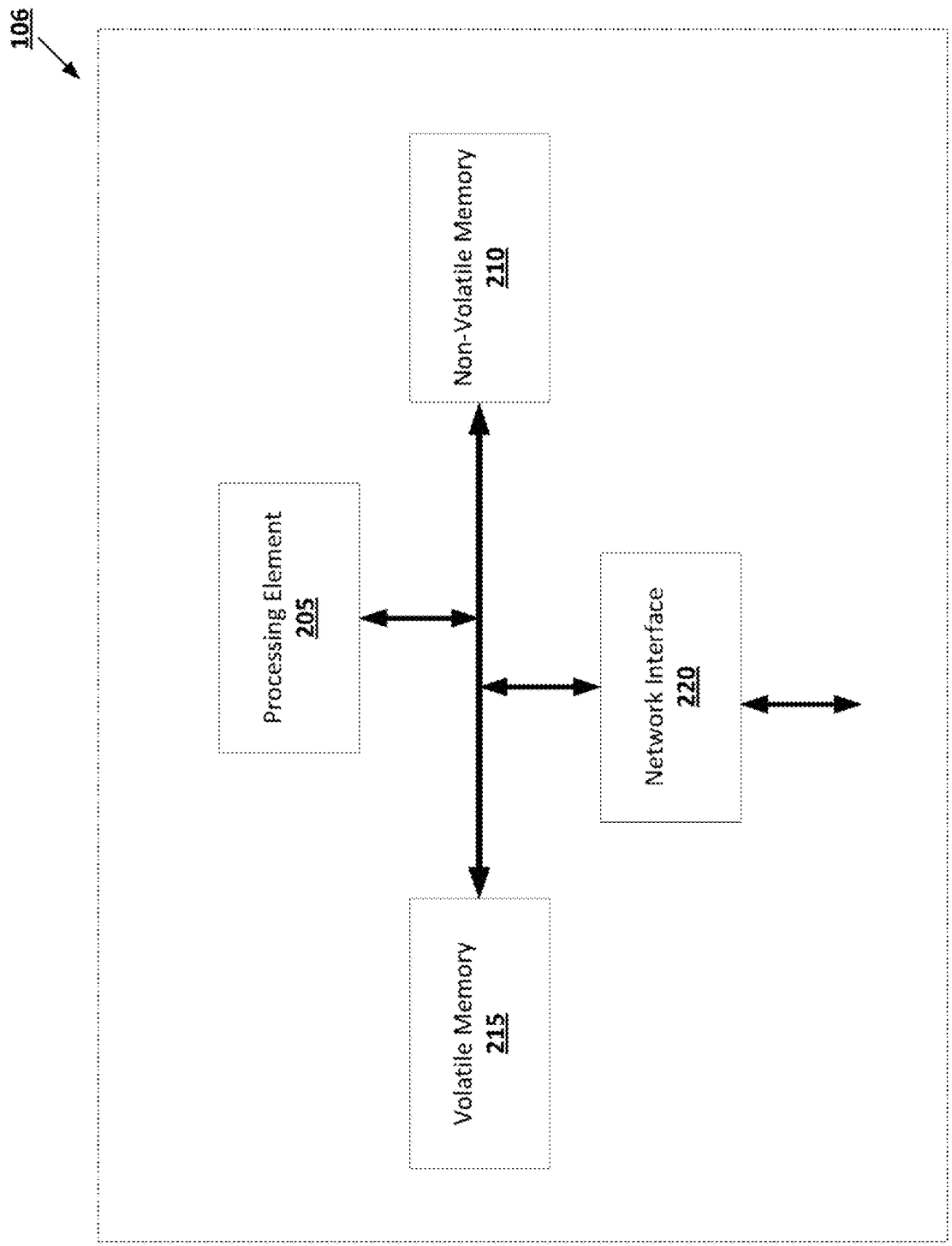

FIG. 2 provides an example PCB design computing entity in accordance with some embodiments discussed herein.

Figure 3:
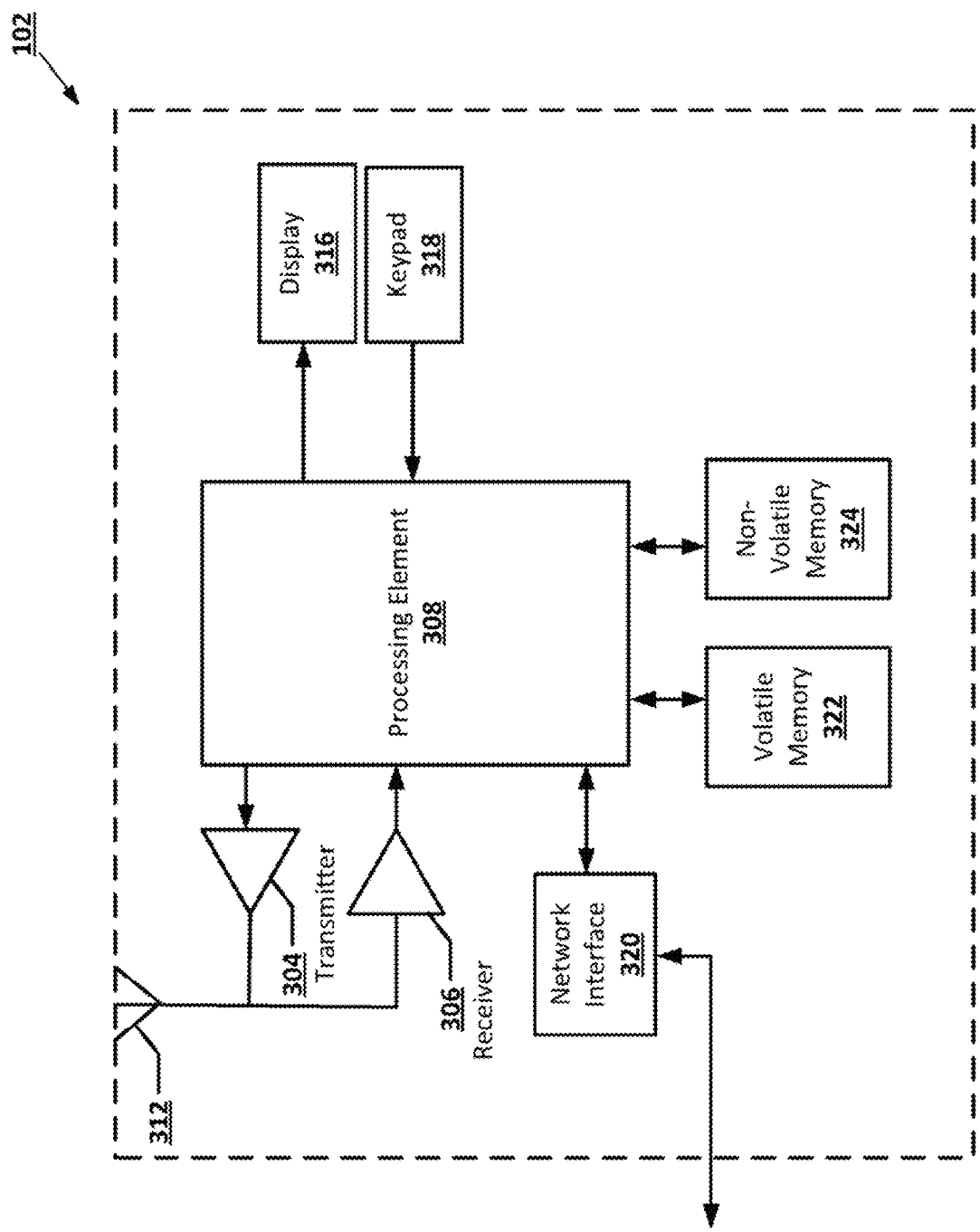

FIG. 3 provides an example client computing entity in accordance with some embodiments discussed herein.

Figure 4:
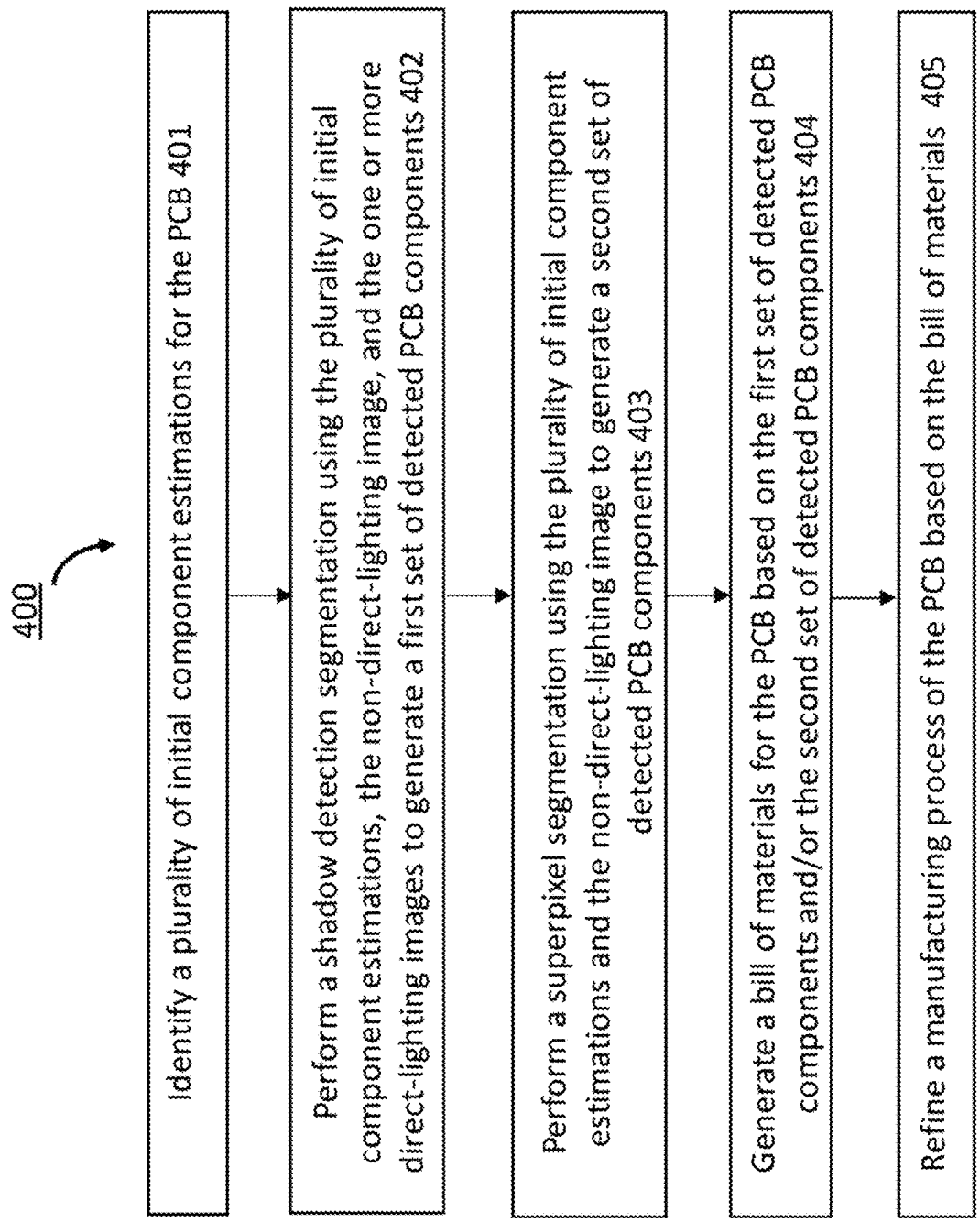

FIG. 4 is a flowchart diagram of an example process for performing automated PCB component detection in accordance with some embodiments discussed herein.

Figure 5:
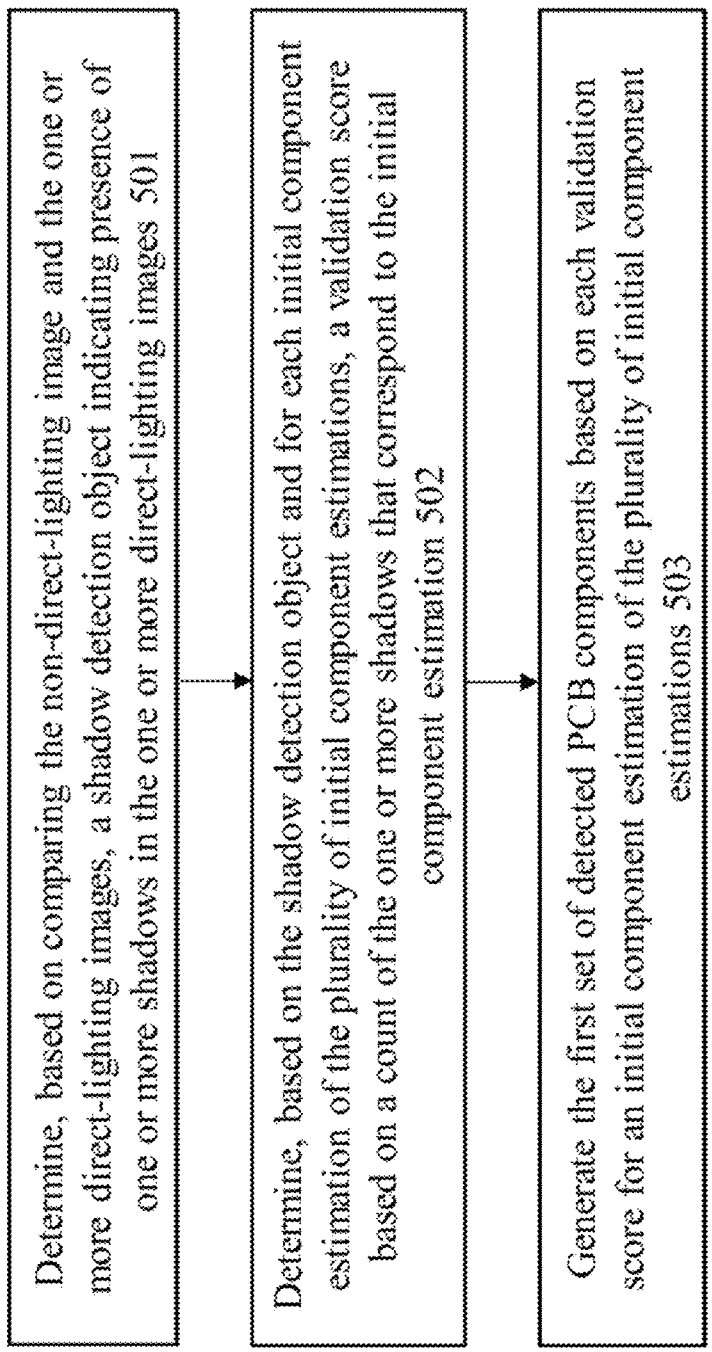

FIG. 5 is a flowchart diagram of an example process for performing shadow detection segmentation in accordance with some embodiments discussed herein.

Figure 6:
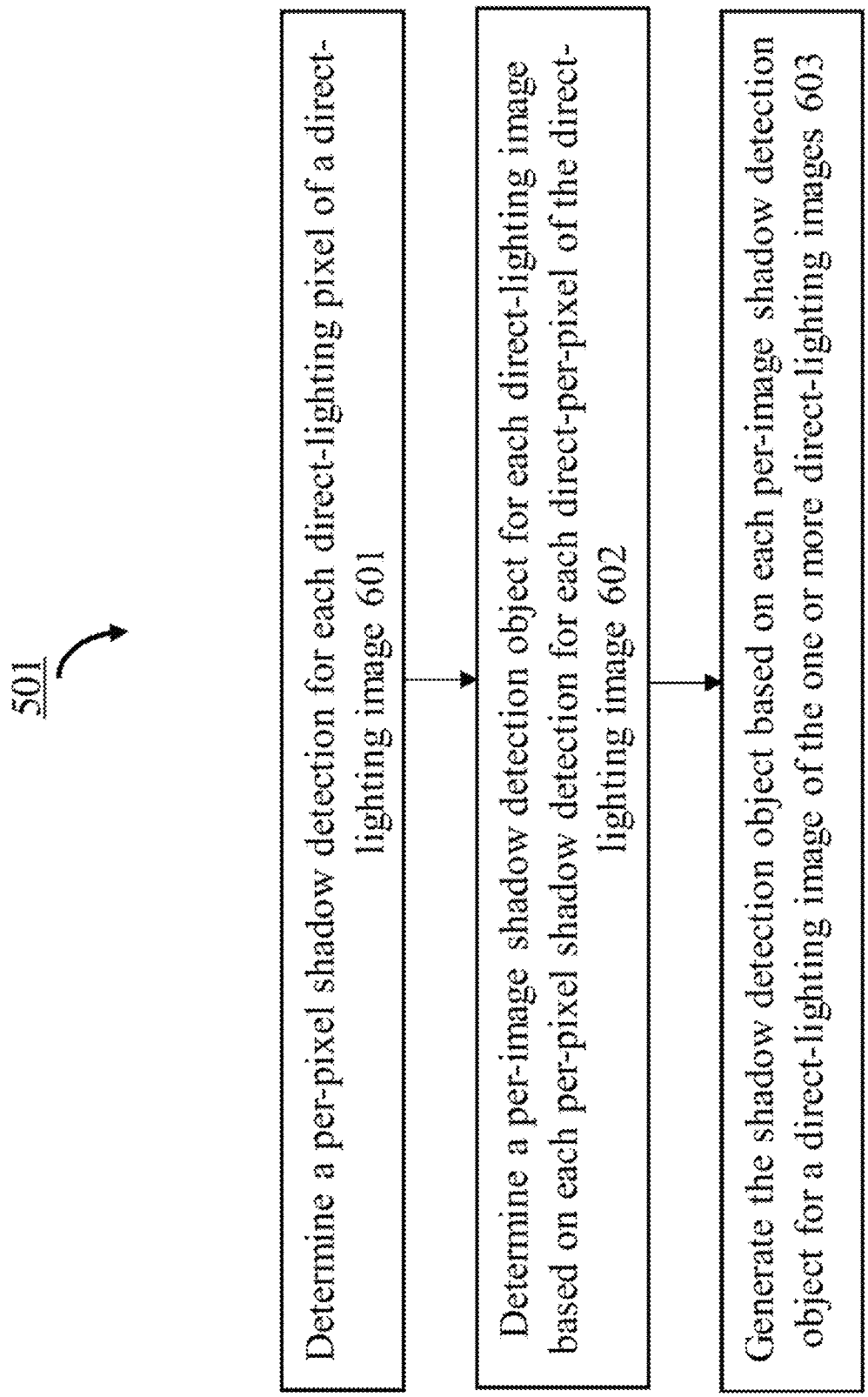

FIG. 6 is a flowchart diagram of an example process for generating a shadow detection segmentation in accordance with some embodiments discussed herein.

Figure 7A:
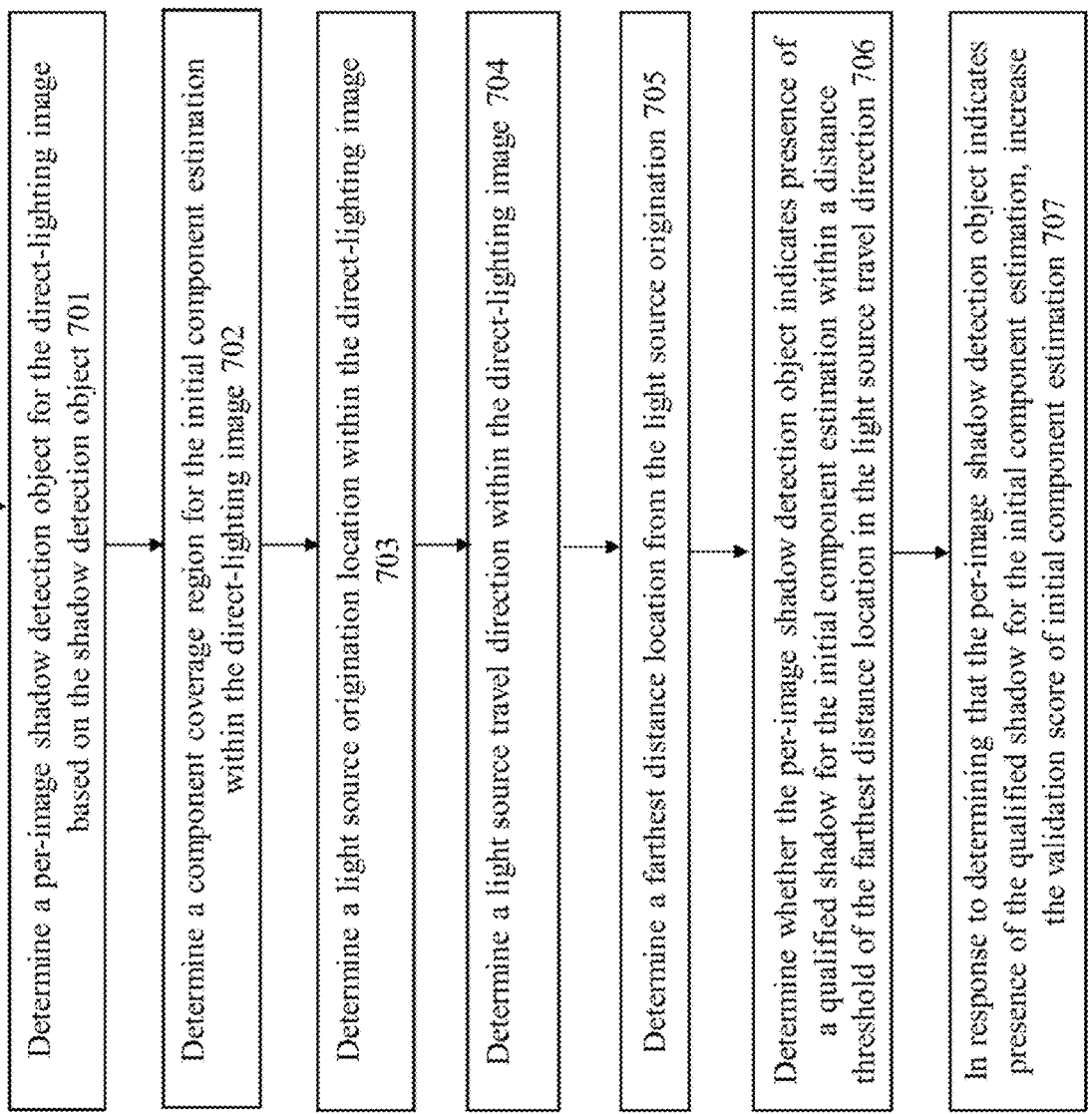

FIG. 7A is a flowchart diagram of an example process for determining whether a direct-lighting image validates an initial component estimation in accordance with some embodiments discussed herein.

Figure 7B:
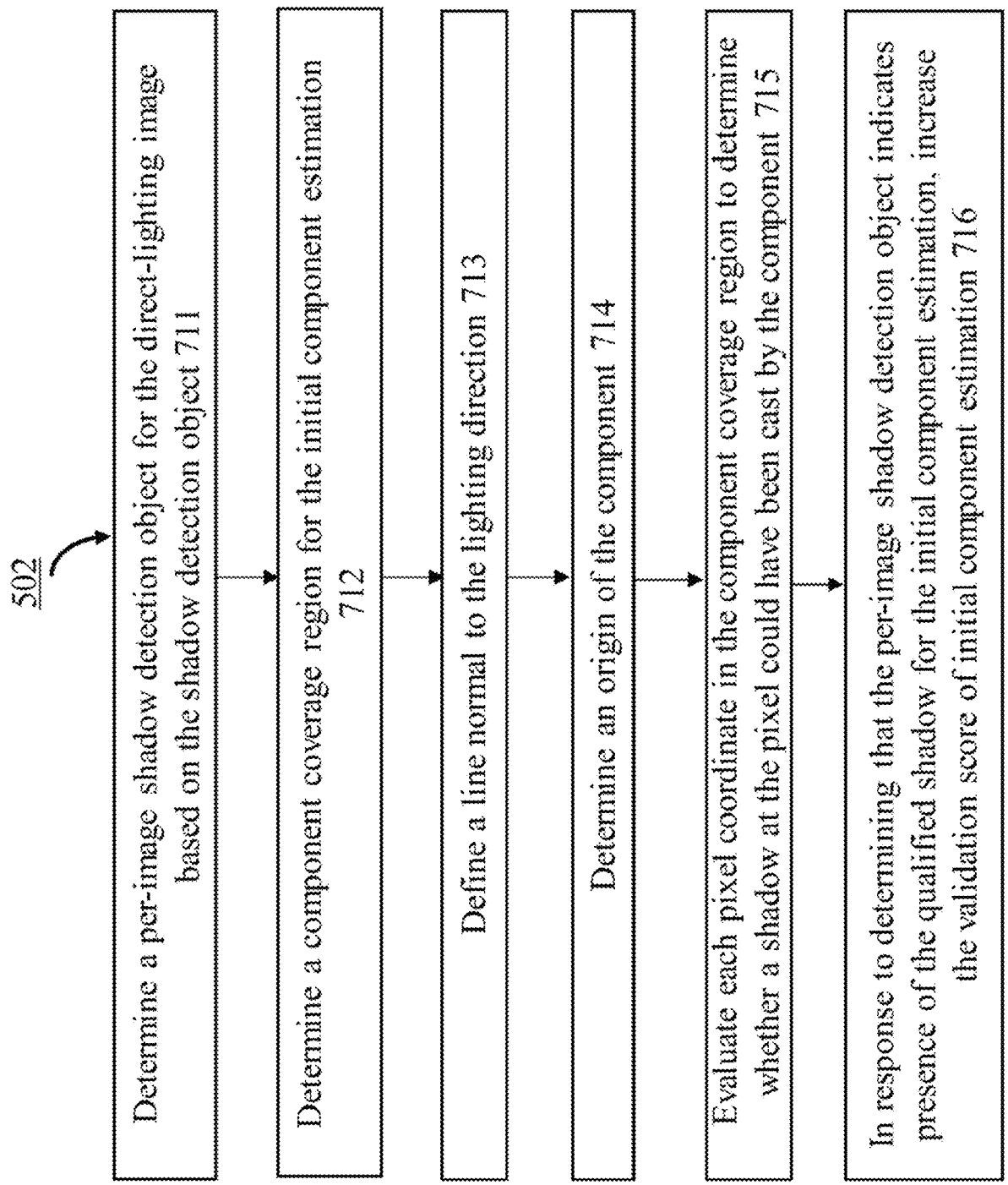

FIG. 7B is a flowchart diagram of an alternative example process for determining whether a direct-lighting image validates an initial component estimation in accordance with some embodiments discussed herein.

Figure 8:
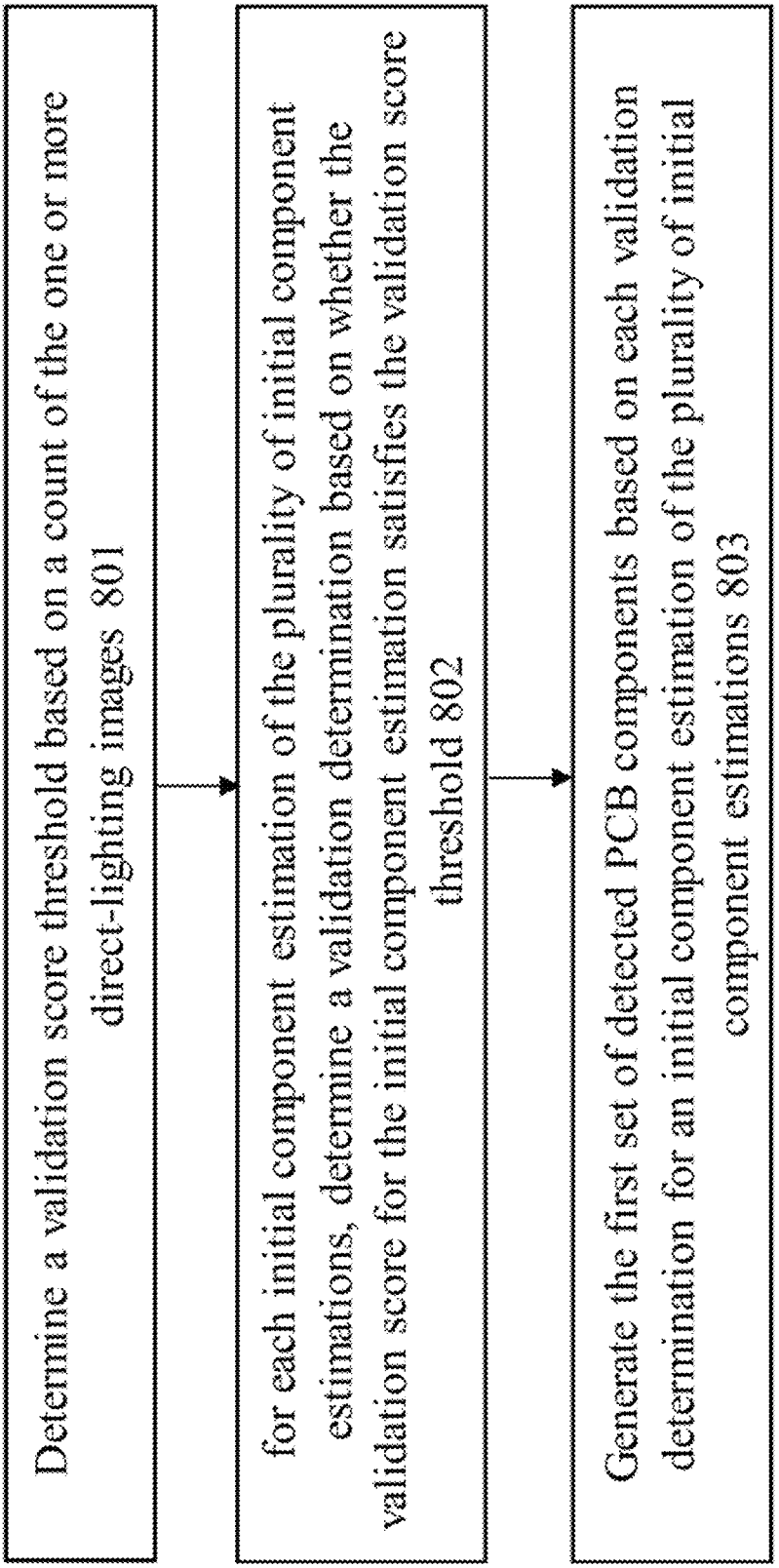

FIG. 8 is a flowchart diagram of an example process for generating a first set of detected PCB components for a PCB in accordance with some embodiments discussed herein.

Figure 9:
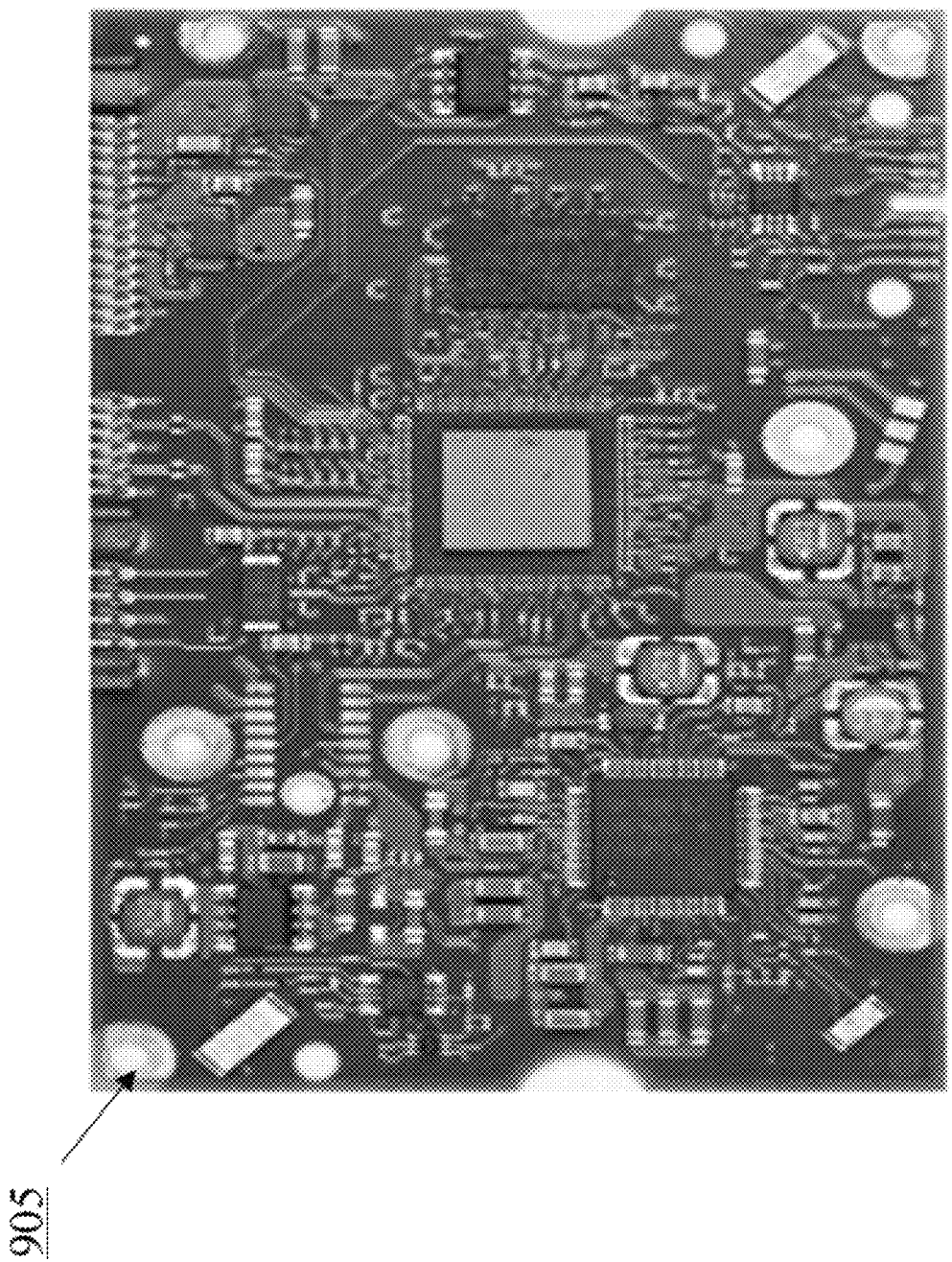
Figure 10A:
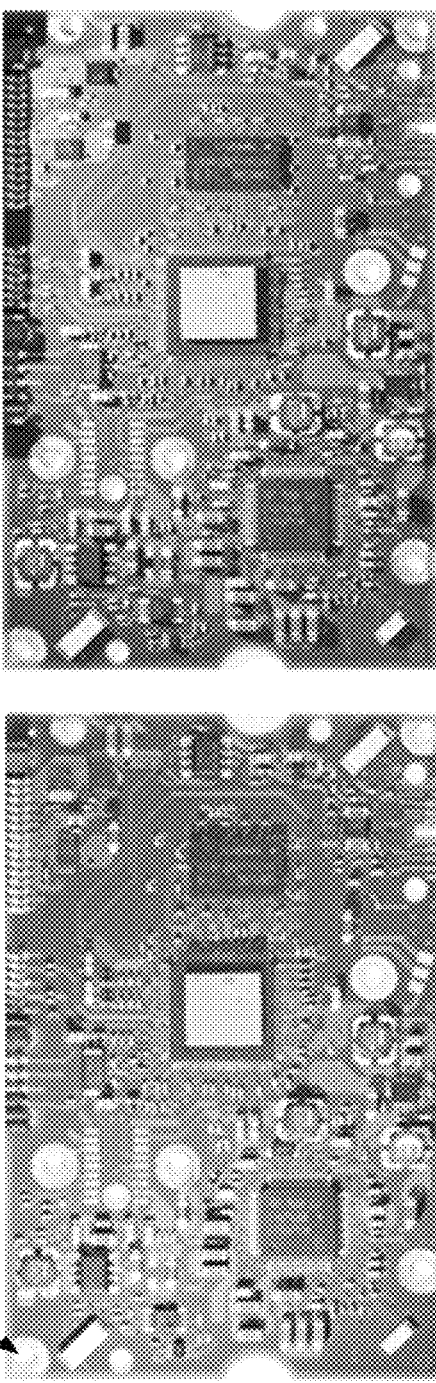
Figure 10B:
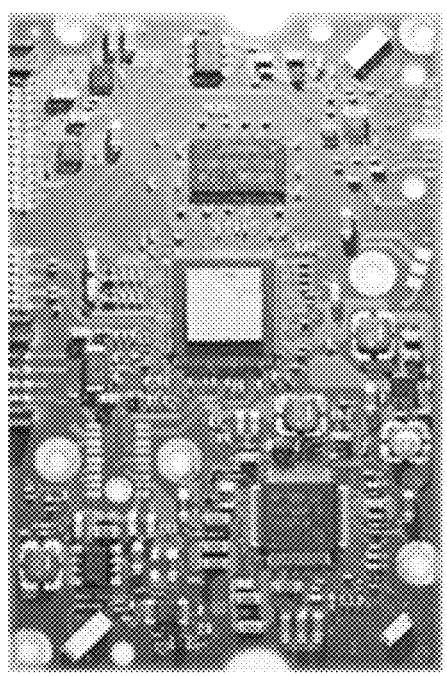
Figure 10C:
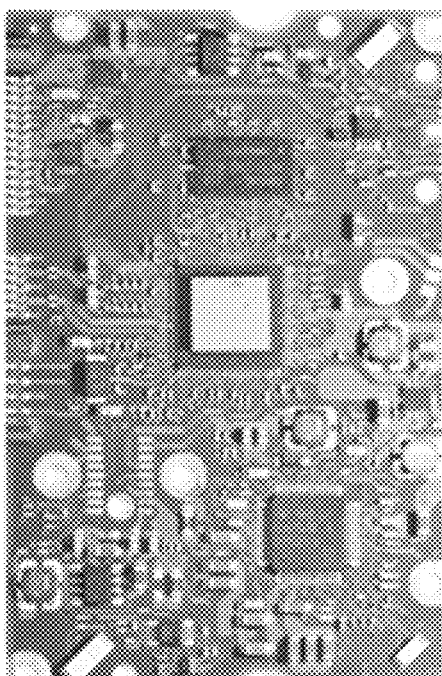
Figure 10D:
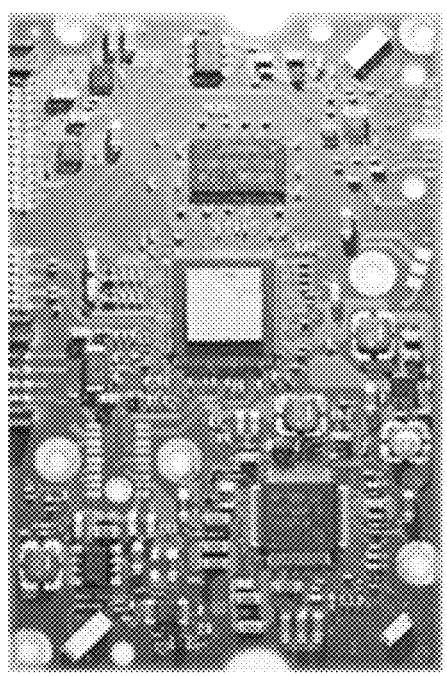

FIG. 9 provides an operational example of a non-direct-lighting image in accordance with some embodiments discussed herein.

FIGS. 10A-10D provide operational examples of direct-lighting images in accordance with some embodiments discussed herein.

Figure 11:
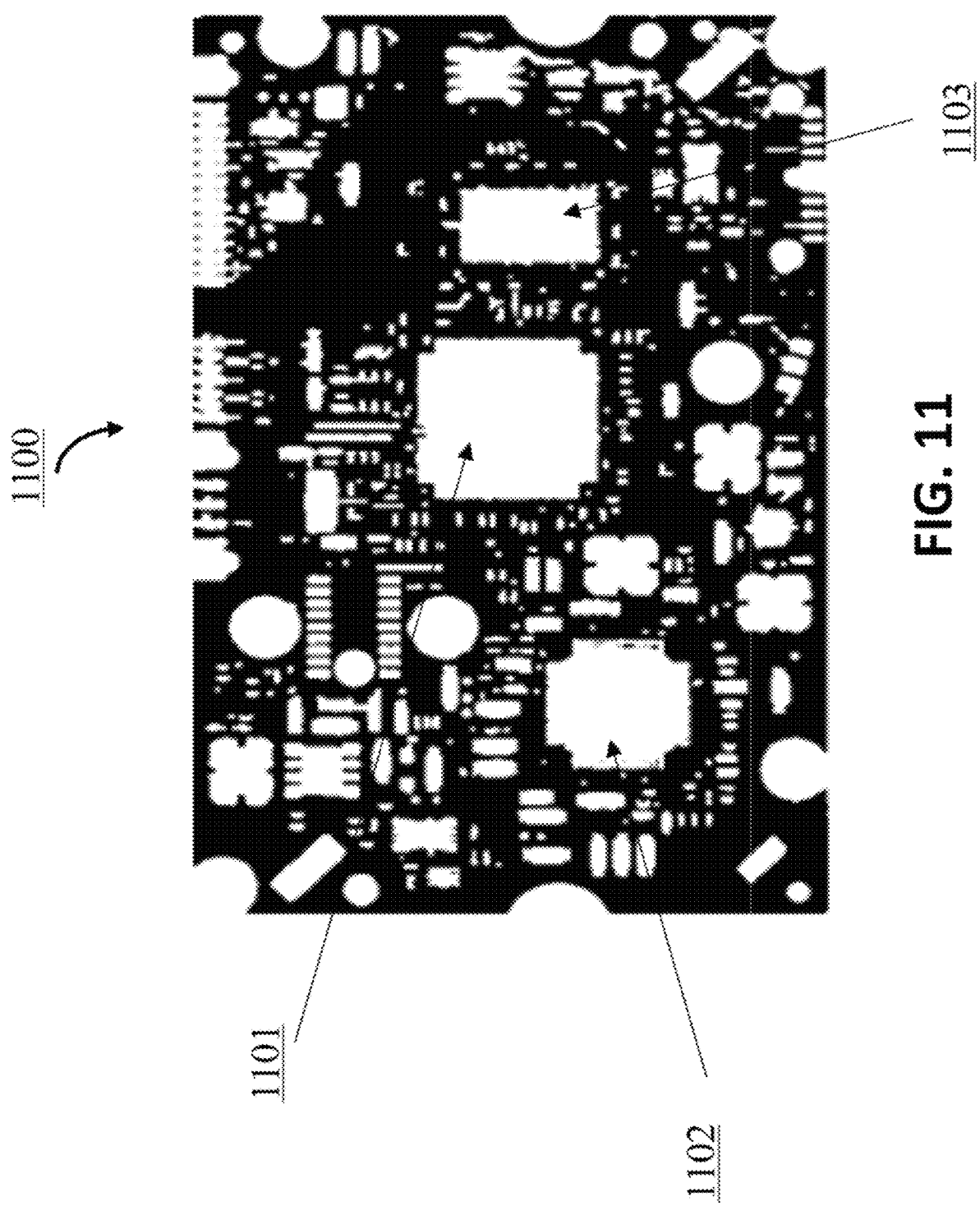

FIG. 11 provides an operational example of an initial component estimation image in accordance with some embodiments discussed herein.

Figure 12:
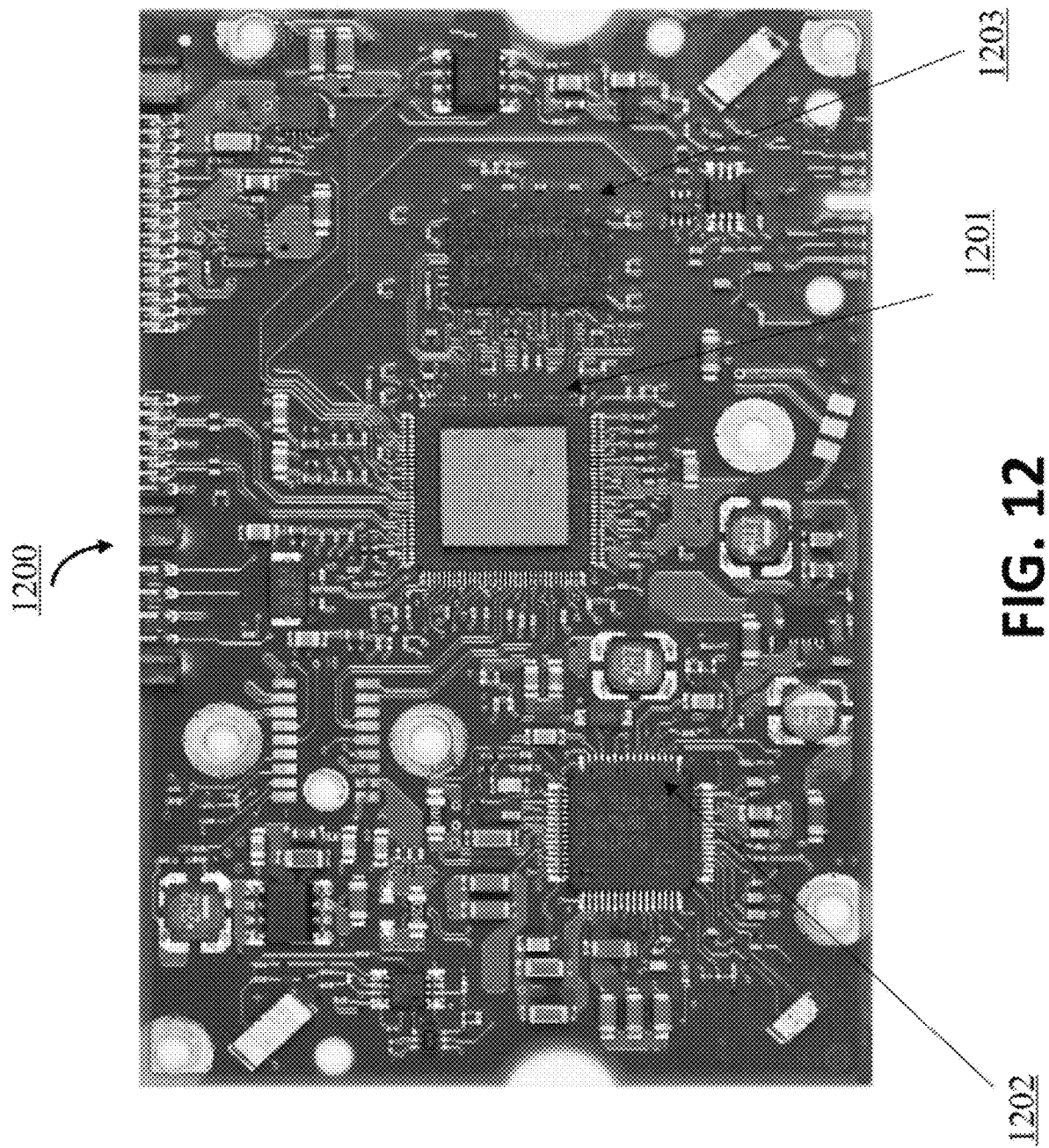

FIG. 12 provides an operational example of a per-image shadow detection in accordance with some embodiments discussed herein.

Figure 13:
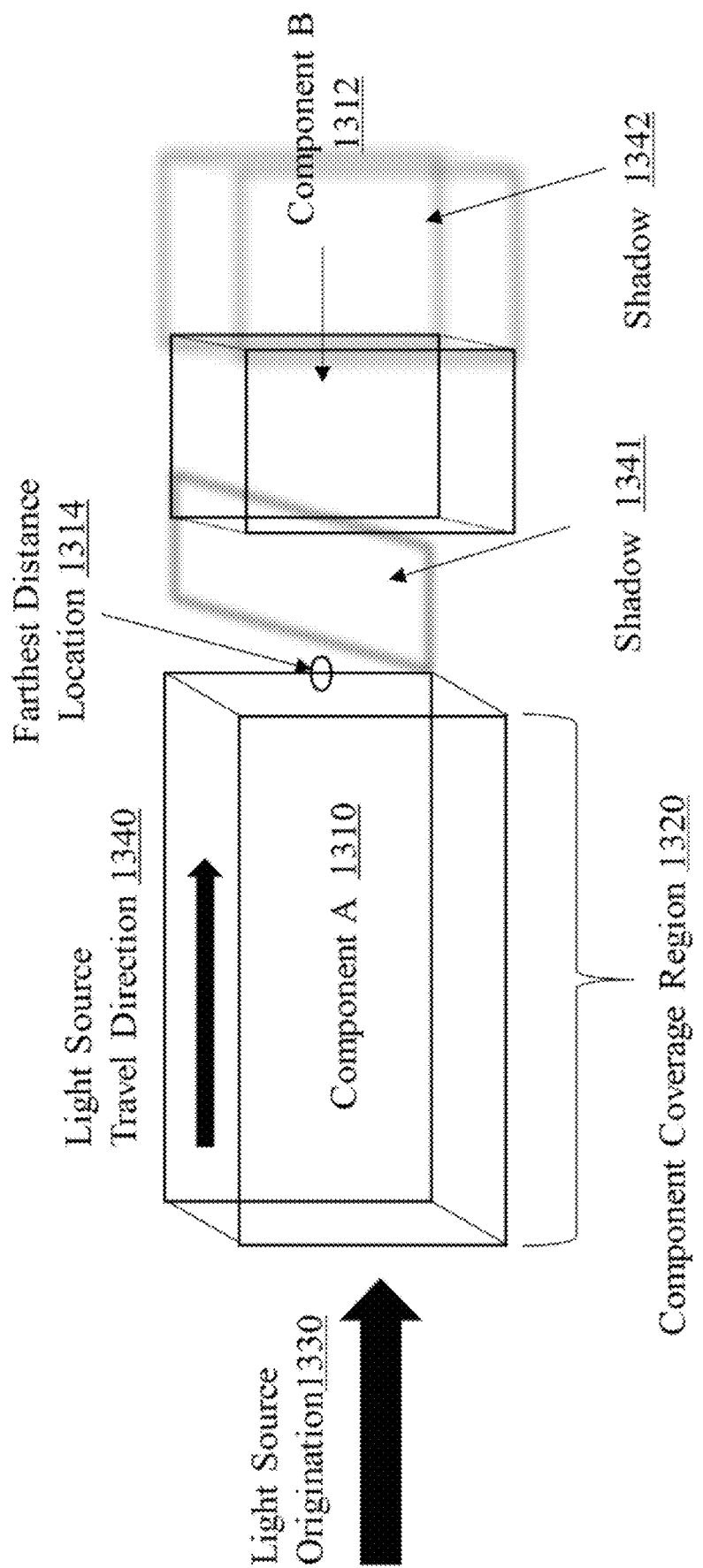

FIG. 13 provides an operational example of determining whether a direct-lighting image validates an initial component estimation in accordance with some embodiments discussed herein.

Figure 14:
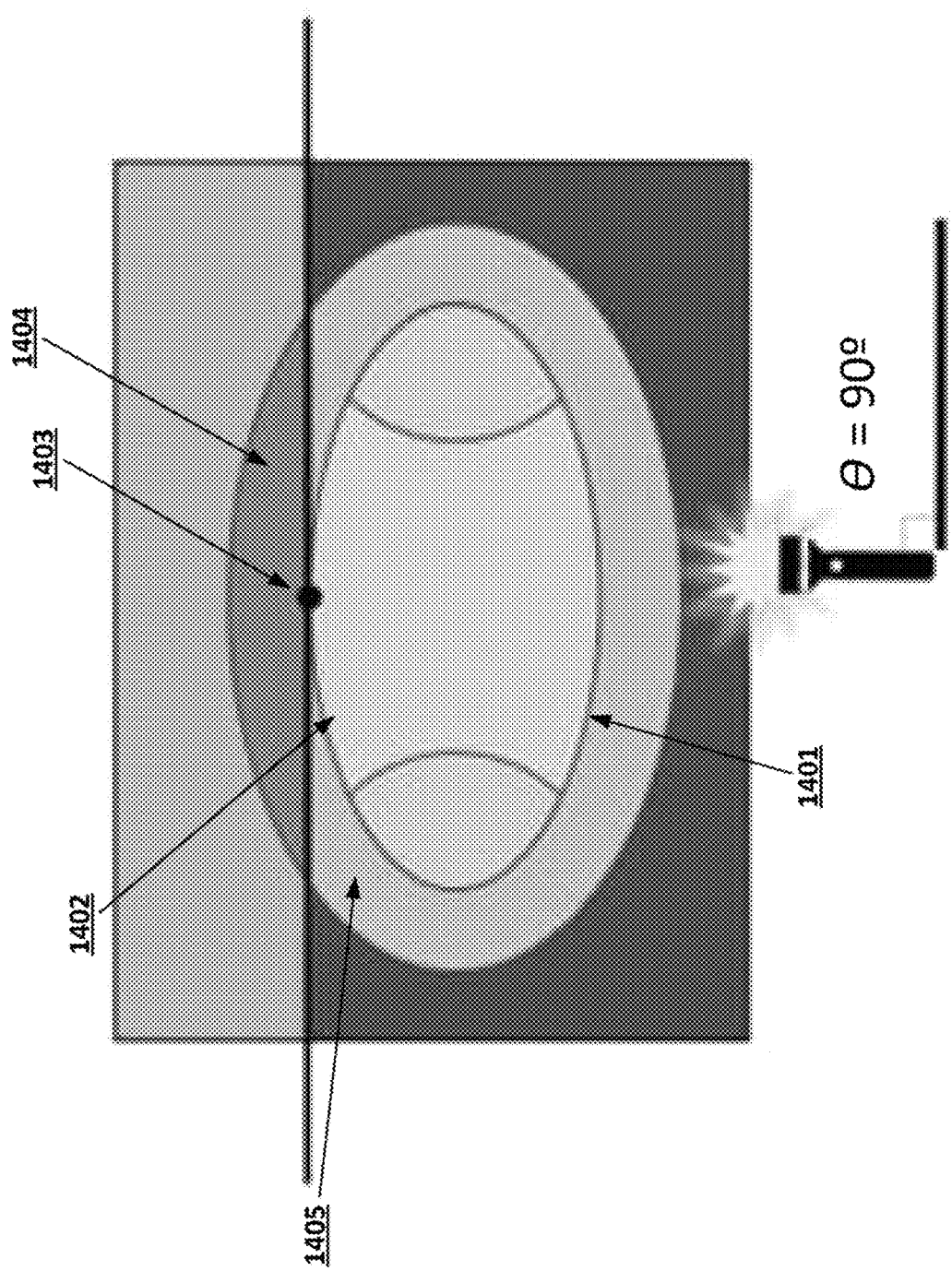

FIG. 14 provides another operational example of determining whether a direct-lighting image validates an initial component estimation in accordance with some embodiments discussed herein.

Figure 15:
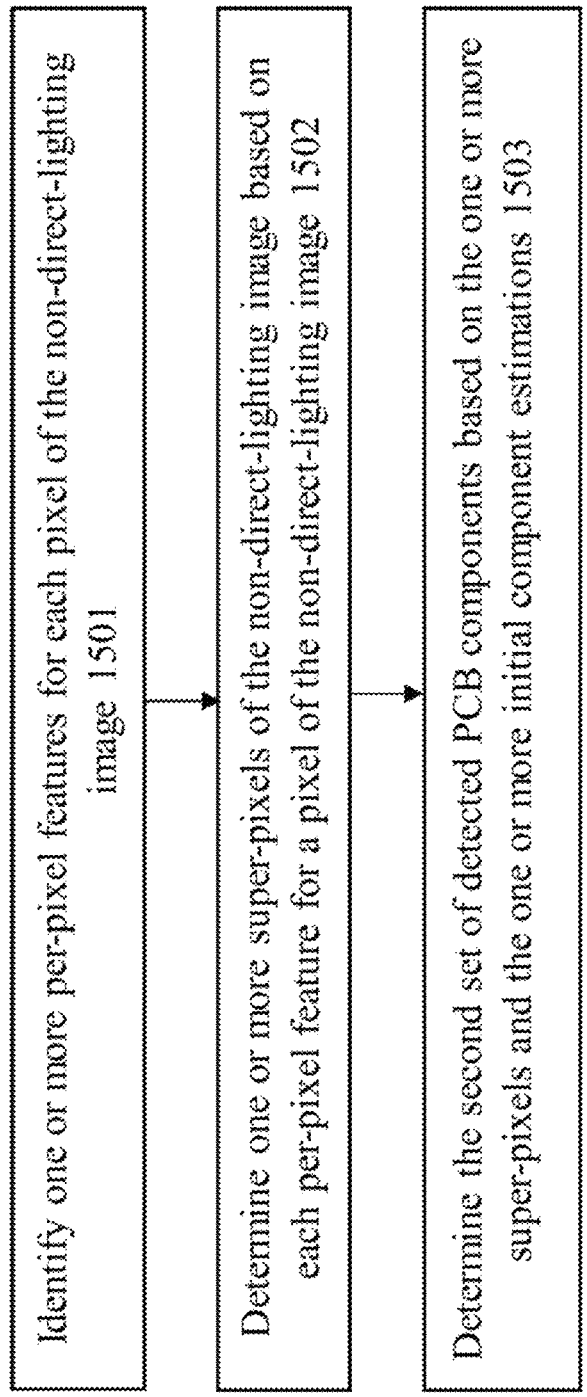

FIG. 15 is a flowchart diagram of an example process for performing super-pixel segmentation in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention provide techniques for automated PCB component detection using at least one of shadow detection segmentation or super-pixel segmentation. By enabling automated PCB component detection, various embodiments of the present invention can increase the efficiency of PCB component detection. Since PCB component detection is an important component of PCB manufacturing, the disclosed techniques can be utilized to more efficiently generate bills of materials for PCBs as well as to refine PCB manufacturing processes to increase the efficiency of the noted PCB manufacturing processes.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component(s) without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1A is a schematic diagram of an example architecture 100 for performing automated PCB component detection. The hardware architecture 100 includes a PCB design system 101 configured to receive PCB images from the client computing entities 102, process the PCB images to identify PCB component estimations within corresponding PCBs, and utilize the generated PCBs to generate bills of materials for PCBs and/or refine a PCB manufacturing process.

In some embodiments, PCB design system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The PCB design system 101 may include a PCB design computing entity 106 and a storage subsystem 108. The PCB design computing entity 106 may be configured to perform automated PCB component estimations and refine PCB manufacturing processes based at least in part on the automated PCB component estimations. The storage subsystem 108 may be configured to store PCB images used by the PCB design computing entity 106 to perform automated PCB component detection. The storage subsystem 108 may further be configured to store model definition data for detection models used by the PCB design computing entity 106 to perform automated PCB component detection.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

FIG. 1B is a schematic diagram of a software architecture 150 for performing automated PCB component detection. The software architecture 150 includes an image acquisition unit 151, an image analysis unit 152, a model evaluation unit 153, and a domain knowledge unit 154.

The image acquisition unit 151 may be configured to obtain (e.g., receive and/or capture) PCB images that are then passed on to the image analysis unit 152 and the model evaluation unit 153. The image analysis unit 152 may be configured to process the PCB images to generate one or more PCB component estimations for each PCB. The model evaluation unit 153 may be configured to compare PCB component estimations generated by the image analysis unit 152 to ground-truth PCB component estimations in order to generate a measure of detection accuracy of one or more detection models utilized by the image analysis unit 152. The domain knowledge unit 154 may be configured to provide data regarding PCB common industry design standards and/or other PCB-related domain knowledge information to the image analysis unit 152.

The image analysis unit 152 may include a PCB image preprocessing subunit 161, a PCB feature extraction subunit 162, a PCB component detection subunit 163, a component image preprocessing subunit 164, a component feature extraction subunit 165, and a component classification subunit 166.

The PCB image preprocessing subunit 161 may be configured to modify PCB images to ensure that images of similar PCBs taken under different conditions still yield similar features after PCB feature extraction performed by the PCB feature extraction subunit 162. The PCB feature extraction subunit 162 may be configured to extract features such as color-based features, shape-based features, and texture-based features from each modified PCB image generated by the PCB image preprocessing subunit 161. The PCB component detection subunit 163 may be configured to detect regions within PCB images where PCB components are located. The component image preprocessing subunit 164 may be configured to modify images of PCB components detected by the PCB component detection subunit 163 to ensure that images of similar PCB components taken under different conditions still yield similar features after component feature extraction performed by the component feature extraction subunit 165. The component feature extraction subunit 165 may be configured to extract features such as color-based features, shape-based features, and texture-based features from each modified PCB component image generated by the PCB image preprocessing subunit 161. The component classification subunit 166 may be configured to classify PCB components (e.g., based at least in part on the type of those PCB components and/or based other properties of those PCB components) using the component-level features extracted by the component feature extraction subunit 165.

The model evaluation unit 153 may include a PCB image annotation subunit 171, a knowledgebase subunit 172, and an evaluation subunit 173. The PCB image annotation subunit 171 may be configured to obtain (e.g., based at least in part on human-generated data) ground-truth information about various PCB components associated with the PCBs whose images are obtained by the image acquisition unit 151. The knowledgebase subunit 172 may be configured to store the PCB images obtained by the image acquisition unit 151 as well as the ground-truth information generated by the PCB image annotation subunit 171. The evaluation subunit 173 is configured to compare the PCB component classifications, detections, and identifications generated by the image analysis unit 152 with the ground-truth information maintained in the knowledgebase subunit 172 to generate a measure of detection accuracy of the detection models utilized by the image analysis unit 152.

Exemplary PCB Design Computing Entity

FIG. 2 provides a schematic of a PCB design computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the PCB design computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the PCB design computing entity 106 may include or be in communication with one or more processing elements 205 (also referred to as processors, processing circuitry, and/or similar terms used herein interchangeably) that communicate with other elements within the PCB design computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field-programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the PCB design computing entity 106 may further include or be in communication with non-volatile media (also referred to as non-volatile storage, memory, memory storage, memory circuitry, and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the PCB design computing entity 106 may further include or be in communication with volatile media (also referred to as volatile storage, memory, memory storage, memory circuitry, and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the PCB design computing entity 106 with the assistance of the processing element 205 and operating system.

As indicated, in one embodiment, the PCB design computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the PCB design computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the PCB design computing entity 106 may include or be in communication with one or more input elements, such as a keyboard input, a mouse input, a touch screen/display input, motion input, movement input, audio input, pointing device input, joystick input, keypad input, and/or the like. The PCB design computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the PCB design computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the PCB design computing entity 106 via a network interface 320.

Via these communication standards and protocols, the client computing entity 102 can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location-determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the PCB design computing entity 106, as described herein. The user input interface can comprise any of a number of devices or interfaces allowing the client computing entity 102 to receive data, such as a keypad 318 (hard or soft), a touch display, voice/speech or motion interfaces, or other input device(s). In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate and/or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the PCB design computing entity 106 and/or various other computing entities.

In another embodiment, the client computing entity 102 may include one or more components or functionality that are the same or similar to those of the PCB design computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operations

FIG. 4 is an example process for performing automated PCB component detection for a PCB using a non-direct-lighting image of the PCB and one or more direct-lighting images of the PCB, in accordance with some embodiments. Generally, non-surface mounted PCB components do not cast shadows in a non-direct-lighting image. On the other hand, one or more surface-mounted PCB components cast shadows in the one or more direct-lighting images. In some embodiments, the plurality of images comprises a non-direct-lighting image and one or more direct-lighting images. A non-direct-lighting image is an image of the PCB taken when a light source is projected from an angle that is normal to a PCB. A direct-lighting image is an image of a PCB taken at an angle that is not normal to the PCB. Via the various steps/operations of the process 400, the PCB design computing entity 106 can perform component validation for the PCB in an effective and efficient manner by integrating information obtained from the plurality of images taken with non-direct-lighting and direct-lighting.

An operational example of a non-direct-lighting image for a PCB is depicted in FIG. 9. In the non-direct-lighting image of FIG. 9, since the light is projected normal to the PCB, surface-mounted components, i.e., components with significant heights, do not cast a shadow. Operational examples of direct-lighting images for a PCB are depicted in FIGS. 10A-10D. Unlike the non-direct-lighting image, in the direct-lighting images, the PCB components cast a shadow. FIGS. 10A-10D show a same PCB with a light source from different directions. In the direct-lighting images, the PCB components cast a shadow. As an example, in FIG. 10A, the light source 1001 is located on an upper left side of the PCB. As a result, each of the components of the PCB cast a shadow on a lower right side of the PCB. As another example, in FIG. 10B, the light source 1002 is located on an upper right side of the PCB. As a result, each of the components of the PCB cast a shadow on a lower left side of the PCB. As yet another example, in FIG. 10C, the light source 1003 is located on a lower right side of the PCB. As a result, each of the components of the PCB cast a shadow on an upper left side of the PCB. Similarly, and as another example, in FIG. 10D, the light source 1004 is located on a lower left side of the PCB. As a result, each of the components of the PCB cast a shadow on an upper right side of the PCB.

The process 400 begins at step/operation 401 when the PCB design computing entity 106 identifies a plurality of initial component estimations for the PCB. In some embodiments, an initial component estimation is a region of the non-direct-lighting image that is estimated to include a PCB component. In some embodiments, the PCB design computing entity 106 generates an initial component estimation using an initial component estimation technique, such as a background subtraction technique via RGB chromaticity thresholding, Otsu thresholding, k-means segmentation, Gaussian mixture models, and/or the like. For instance, the background subtraction technique may be configured to identify a PCB component as a contiguous region of the non-direct-lighting image that has distinct color properties relative to color properties of a PCB background, e.g., when a contiguous region of the non-direct-lighting image has a color that is different than a PCB background color.

An operational example of an initial component estimation image 1100 is depicted in FIG. 11. In some embodiments, the initial component estimation image 1100 includes various initial component estimations, such as the exemplary initial component estimations 1101-1103. As depicted in FIG. 11, each exemplary initial component estimation 1101-1103 is associated with a corresponding contiguous region of the non-direct-lighting image of FIG. 9.

At step/operation 402, the PCB design computing entity 106 performs a shadow detection segmentation using the plurality of initial component estimations, the non-direct-lighting image, and the one or more direct-lighting images in order to generate a first set of detected PCB components. The shadow detection segmentation may be a computer-implemented process that may be configured to detect PCB components using a non-direct-lighting image of a PCB and one or more direct-lighting images of the PCB and by utilizing information about detected shadows within the one or more direct-lighting images.

A flowchart diagram of an example process for determining a shadow detection segmentation is shown in FIG. 5. At step/operation 501, the PCB design computing entity 106 determines, i.e., designates, a shadow detection object indicating presence of one or more shadows in the one or more direct-lighting images. In some embodiments, the PCB design computing entity 106 determines the shadow detection object based at least in part on comparing the non-direct-lighting image and the one or more direct-lighting images. In some embodiments, each direct-lighting image of the one or more direct-lighting images includes one or more direct-lighting pixels. Similarly, the non-direct-lighting image may include one or more non-direct-lighting pixels.

FIG. 6 depicts a flowchart diagram of an example process for determining the shadow detection object. At step/operation 601, the PCB design computing entity 106 determines, i.e., designates, a per-pixel shadow detection for each direct-lighting pixel of a direct-lighting image based at least in part on comparing a first darkness of the direct-lighting pixel and a second darkness of a corresponding non-direct-lighting pixel in the non-direct-lighting image. For example, the PCB design computing entity 106 may generate the per-pixel shadow detection for the direct-lighting pixel 1005 in the direct-lighting image of FIG. 10A based at least in part on comparing the darkness of the direct-lighting pixel 1005 and the darkness of the non-direct-lighting pixel 905 of the non-direct-lighting image of FIG. 9, which is the non-direct-lighting pixel in the non-direct-lighting image of FIG. 9 that corresponds to the direct-lighting pixel 1005 in the direct-lighting image of FIG. 10A.

For instance, in various embodiments, the PCB design computing entity 106 may perform step/operation 601 by initially enhancing the shadows appearing in the direct-lighting image. In many instances, a directed light source used to generate prominent shadows within a direct-lighting image causes intensity nonuniformities over the PCB surface. Therefore, in some embodiments, the PCB design computing entity 106 normalizes the intensity across the entire board before locating shadows by dividing the direct-lighting image by a Gaussian-blurred version with, for example, σ=100 (where σ is the standard distribution of the corresponding Gaussian distribution). After division, high-frequency board features may remain intact while the intensity profile is normalized across the PCB surface. In addition, in some embodiments, the PCB design computing entity 106 increases shadow contrast using local median filtering by utilizing a window shadow prominence relative to the image dimensions after performing intensity normalization on the direct-lighting image. This can increase shadow prominence relative to the non-direct-lighting image when later searching for pixel-level differences.

After enhancing the shadows appearing in the direct-lighting image, the PCB design computing entity 106 obtains a local maximum shadow intensity estimate in particular embodiments through the use of Gaussian blurring with, for example, σ=100. Such an estimate can prevent pixels from being misclassified as shadows from minor neighborhood variations.

After performing Gaussian blurring operations discussed above, the PCB design computing entity 106 in some embodiments performs the pixel comparison between the direct-lighting pixels of the direct-lighting image with the corresponding non-direct-lighting pixels in the non-direct-lighting image to determine the direct-lighting pixels containing a shadow in order to determine the per-pixel shadow detection for each direct-lighting pixel. Accordingly, in particular embodiments, the PCB design computing entity 106 determines that a direct-lighting pixel contains a shadow if at least one color channel of the direct-lighting pixel is darker than the corresponding non-direct-lighting pixel in the non-direct-lighting image and at least one color channel of the direct-lighting pixel is darker than the local maximum shadow intensity estimate at that location. In some embodiments, a pixel $p_i(m, n)$ is considered a shadow pixel if:

$$\sum_{i=1}^{3} u(q_i(m, n) - p_i(m, n)) \geq 1 \qquad (1)$$

and $$\sum_{i=1}^{3} u(t(m, n) - p_i(m, n)) \geq 1, \qquad (2)$$

where u is a unit-step function, i is the color channel (.e.g., red, green, blue), (m, n) are the pixel coordinates of $p_i(m, n)$, p is the direct-lighting image under test, q is the non-direct-lighting image, and t is the local maximum shadow intensity estimate.

At step/operation 602, the PCB design computing entity 106 determines, i.e., designates, a per-image shadow detection object for each direct-lighting image based at least in part on each per-pixel shadow detection for the direct-lighting image pixel. The PCB design computing entity 106 may determine the per-image shadow detection object for a corresponding direct-lighting image by aggregating each per-pixel shadow detection associated with a corresponding direct-lighting image. For example, the per-image shadow detection object for each direct-lighting image may be a two-dimensional array that includes each per-pixel shadow detection for a direct-lighting pixel of the direct-lighting image as a value of the noted two-dimensional array.

At step/operation 603, the PCB design computing entity 106 generates the shadow detection object based at least in part on each per-image shadow detection object for a direct-lighting image of the one or more direct-lighting images. In some embodiments, the shadow detection object can be obtained by aggregating each per-image shadow detection object for a direct-lighting image. For example, the shadow detection object may be a three-dimensional array that includes each two-dimensional array constituting a per-image shadow detection object for a direct-lighting image of the one or more direct-lighting images.

An operational example of a per-image shadow detection object is depicted in FIG. 12. As depicted in FIG. 12, for each direct-lighting pixel of the corresponding direct-lighting image of FIG. 10A, the depicted per-image shadow detection object indicates a measure of relative darkness of the noted direct-lighting pixel compared to a corresponding pixel of the non-direct-lighting image. As depicted in FIG. 12, the darker locations in the per-image shadow detection object of FIG. 12 (such as the darker locations 1201, 1202, and 1203) are indicative of shadows, which can be cast by components with non-negligible height. As a non-limiting example, the darker locations 1201, 1202, and 1203 are labeled on FIG. 12.

Returning to FIG. 5, at step/operation 502, the PCB design computing entity 106 determines, i.e., designates, a validation score for each initial component estimation based at least in part on a count of the one or more shadows that correspond to the initial component estimation. A flowchart diagram of an example process for determining whether a direct-lighting image validates an initial component estimation is illustrated in FIG. 7A. According to the process illustrated in FIG. 7A, at step/operation 701, the PCB design computing entity 106 determines a per-image shadow detection object for the direct-lighting image based at least in part on the shadow detection object. The PCB design computing entity 106 may extract the per-image shadow detection object for the direct-lighting image from the shadow detection object (e.g., extract a two-dimensional array corresponding to the comparative darkness values of the direct-lighting image from the three-dimensional array constituting the shadow detection object).

At step/operation 702, the PCB design computing entity 106 determines, i.e., designates, a component coverage region for the initial component estimation within the direct-lighting image. A component coverage region for the initial component estimation is a data object that describes a corresponding region of the direct-lighting image that is deemed to be occupied by the initial component estimation within the direct-lighting image. For example, as depicted in FIG. 13, component A 1310 has a component coverage region 1320 within the corresponding direct-lighting image.

At step/operation 703, the PCB design computing entity 106 determines, i.e., designates, a light source origination location within the corresponding direct-lighting image. The light source origination may be a location within the direct-lighting image where the PCB design computing entity 106 detects a highest intensity of the light. For example, as depicted in FIG. 13, the PCB design computing entity 106 detects a light source origination 1330 by determining the location within the corresponding direct-lighting image where the highest intensity of the light is detected, e.g., lightest coverage region compared to the neighboring regions.

At step/operation 704, the PCB design computing entity 106 determines, i.e., designates, a light source travel direction within the direct-lighting image. The PCB design computing entity 106 may determine the light source travel direction by comparing a rate of change of intensity of light within a straight line throughout the direct-lighting image. For example, as depicted in FIG. 13, the PCB design computing entity 106 determines the light source travel direction 1340 for the light source associated with the light source origination 1330.

At step/operation 705, the PCB design computing entity 106 determines, i.e., designates, within the component coverage region, a farthest distance location from the light source origination. The PCB design computing entity 106 may utilize a computational geometry algorithm to perform the determination of the farthest distance location. For example, as depicted in FIG. 13, the PCB design computing entity 106 may determine the farthest distance location 1314 within the component coverage region 1320.

At step/operation 706, the PCB design computing entity 106 determines, i.e., designates, whether the per-image shadow detection object for the direct-lighting image indicates presence of a qualified shadow for the initial component estimation within a distance threshold of the farthest distance location in the light source travel direction. A qualified shadow is a shadow that satisfies a size requirement. In some embodiments, the size requirement is determined based at least in part on an angle of the light source and/or a size of the initial component estimation. For example, as depicted in FIG. 13, the PCB design computing entity 106 may determine whether the shadow 1341, for component A, or shadow 1342, for component B, indicates presence of a qualified shadow for the corresponding initial component estimation.

At step/operation 707, in response to determining that the per-image shadow detection object indicates presence of the qualified shadow for the initial component estimation, the PCB design computing entity 106 increases the validation score of the initial component estimation. In some embodiments, in response to determining that the per-image shadow detection object indicates presence of the qualified shadow for the initial component estimation, the PCB design computing entity 106 increments the validation score of the initial component estimation by one.

FIG. 13 depicts an operational example of determining, i.e., designating, whether a direct-lighting image validates an initial component estimation. In some embodiments, the PCB design computing entity 106 designates an initial invalid score to each component, component A 1310 and component B 1312. For the component A 1310, the PCB design computing entity 106 selects a first pixel coordinate for the first component that is farthest from the shadow light source. Subsequently, the PCB design computing entity 106 determines a shadow, satisfying required criteria, within D pixels to the right of the first pixel coordinate. Further, the PCB design computing entity 106 marks the component A 1310 as valid from the light source. Similar operations are performed on component B 1312. In some embodiments, the PCB design computing entity 106 determines the required criteria based at least in part on a size of the component. FIG. 13 further depicts the component B 1312, illustrating that at least a portion of the shadow for one component B may fall on a component coverage region for another component.

A flowchart diagram of an alternative example process for determining whether a direct-lighting image validates an initial component estimation is illustrated in FIG. 7B. Similar to the process illustrated in FIG. 7A, at step/operation 711, the PCB design computing entity 106 determines a per-image shadow detection object for the direct-lighting image based at least in part on the shadow detection object. The PCB design computing entity 106 may extract the per-image shadow detection object for the direct-lighting image from the shadow detection object (e.g., extract a two-dimensional array corresponding to the comparative darkness values of the direct-lighting image from the three-dimensional array constituting the shadow detection object).

At step/operation 712, the PCB design computing entity 106 determines, i.e., designates, a component coverage region for the initial component estimation within the direct-lighting image. Here, the component coverage region for the initial component estimation may be a data object that describes a corresponding region of the direct-lighting image and/or per-image shadow detection object that is deemed to be occupied by the initial component estimation plus all pixel coordinates found within a distance D from the initial component estimation for a component C. For example, a list l of initial component estimations can be formed such that for a D-sidelength square structuring element B, $$l=\{(m, n)|(m, n)\in C\oplus B\}. \quad (3)$$

where (m, n) denotes the pixel coordinates of a point in l.

Accordingly, the PCB design computing entity 106 determines the component coverage region for each initial component estimation by indexing the direct-lighting image and/or per-image shadow detection object using all the coordinates in the list l, which creates a component coverage region (e.g., binary matrix) for the initial component estimation the same size as $C\oplus B$ with designated values (e.g., "1" values) denoting shadow pixels. The component coverage region may be denoted as $S_l$.

Not all locations within the component coverage region may constitute valid shadows cast by the component corresponding to the initial component estimation. Consider the right side of FIG. 14. Since light is cast from the bottom of the image, all shadows resulting from the component 1401 lie on the component's top side 1402. Thus, in various embodiments, shadows outside this region of interest are not used to validate the component.

At step/operation 713, the PCB design computing entity 106 defines a line normal to the lighting direction. In particular embodiments, the angle of the light source in the direct-lighting image is known beforehand. casein some embodiments, an illuminated object will act as if its dimension normal to the lighting angle was projected along the lighting direction. Accordingly, in some embodiments, all potential shadows lie on the opposite side of the line normal to this illumination direction. This concept can be concisely expressed in the following equation:

$$V(m, n; \theta, o_m, o_n) = (m - o_m)\sin(\theta) + (n - o_n)\cos(\theta), \quad (4)$$

where o is farthest coordinate in the component from the light source and V represents the validity of a shadow pixel at coordinate (m, n). V may in some embodiments be positive for legitimate values and negative (e.g., <0) for shadows that could not have originated from the component.

At step/operation 714, the PCB design computing entity 106 determines the origin o of the component. Accordingly, in particular embodiments, the PCB design computing entity 106 performs this particular step/operation without considering the shadows a component casts on itself. As a result, the nearest possible shadow pixel resulting from the component is immediately after the component boundary in a direction opposite from the light source (shown as a dot 1403 in FIG. 14). Expressed more formally, these are the locations for which V must be positive. Therefore, in some embodiments, to determine the origin, the PCB design computing entity 106 initially selects an arbitrary point from within the component as the origin. Next, the PCB design computing entity 106 iterates over each pixel coordinate in the component ((m, n)∈C) and selects as the new origin the coordinate which results in the highest value for V. This is because the pixel within an arbitrarily-shaped component with the largest V may be the farthest point from the lighting direction. Once this point is selected for the origin, all other coordinates (m, n) plugged into V will in some embodiments yield a value <0, which in some embodiments satisfies the conditions outlined in the preceding paragraph.

At step/operation 715, the PCB design computing entity 106 evaluates each pixel coordinate in the component coverage region ((m, n)∈$S_l$) to determine whether a shadow at that pixel could have been cast by the component. Accordingly, in various embodiments, the PCB design computing entity 106 performs this step/operation by creating $S_v$, such that:

$$S_v = \{(m, n) | S_l(m, n) = 1 \cap V(m, n; \theta, o) > 0\} \quad (5)$$

In some embodiments, $S_v$ includes pixels that are considered to have qualified shadows that could have been cast by the component. This is shown in FIG. 14 as the portion 1404 of region 1405 within the distance D from the component estimation (component 1401). Based at least in part on processing these pixels, in some embodiments, the PCB design computing entity 106 determines whether a qualified shadow exists in the per-image shadow detection object for the initial component estimation.

Finally, at step/operation 716, in response to determining that the per-image shadow detection object indicates presence of the qualified shadow for the initial component estimation, the PCB design computing entity 106 increases the validation score of the initial component estimation. As previously noted, in some embodiments, in response to determining that the per-image shadow detection object indicates presence of the qualified shadow for the initial component estimation, the PCB design computing entity 106 increments the validation score of the initial component estimation by one.

It is noted that in some instances non-components that are too close to real components can be falsely validated. This may occur because shadows from one or more real components may be within the region of interest of a non-component. Accordingly, various embodiments may address these false validations by incorporating size and/or shape information during shadow correlation involved in determining whether a per-image shadow detection object indicates presence of a qualified shadow for an initial component estimation. For example, a large rectangular shadow should not be correlated to a small circular object. Parameters that can improve detection performance in particular embodiments include height tolerances, minimum component sizes, minimum distances between two adjacent components, and/or the like.

In addition, in some embodiments, component height and width can be taken into account during shadow correlation to reduce the number of false positives from shadows mistakenly assigned to a component. For instance, oftentimes the angle of the light source for each direct-lighting image is known. Therefore, the PCB design computing entity 106 can be configured in particular embodiments to perform a trigonometric calculation to yield a height estimation of a component once its shadow is located. For example, Let θ be the angle of the light source, l be the shadow length, and H be the component height. Then:

$$\frac{H}{\ell} = \tan(90 - \theta)$$

$$H = \ell\tan(90 - \theta)$$

Further, since a one-to-one relationship often exists between shadow width and component width, the PCB design computing entity 106 can be configured in particular embodiments to generate a width estimation for a component. In some of the noted embodiments, the preprocessing stage is configured to preserve the true shadow width in order to enable generating the width estimation during the processing stage. Accordingly, once height and width information are collected across each direct-lighting image, the PCB design computing entity 106 can be configured to synthesize the results to produce a tentative three-dimensional estimation of the component.

Returning to FIG. 5, at step/operation 503, the PCB design computing entity 106 generates the first set of detected PCB components based at least in part on each validation score for an initial component estimation of the plurality of initial component estimations. A flowchart diagram of an example process for determining whether to include an initial component estimation in the first set of detected PCB components is illustrated in FIG. 8. At step/operation 801, the PCB design computing entity 106 determines a validation score threshold based at least in part on a count of the one or more direct-lighting images. For example, the PCB design computing entity 106 may determine that the validation score threshold is half of the count of the direct-lighting images.

For instance, in some embodiments, a validation score threshold is determined based at least in part on a count of the direct-lighting images. The validation score threshold is a validation score which the PCB design computing entity 106 uses to determine an initial component estimation is a valid component, i.e., a surface-mounted component. For example, in some embodiments, a validation score threshold includes a number of validations as indicated by the validation score for a particular component estimation equal to one half of the number of the direct-lighting images.

At step/operation 802, the PCB design computing entity 106 determines a validation determination for the initial component estimation based at least in part on whether the validation score for the initial component estimation satisfies the validation score threshold. In some embodiments, the PCB design computing entity 106 designates a "valid" or an "invalid" label for each component in the initial component estimation based at least in part on whether the validation score for the initial component estimation satisfies the validation score threshold. In response to determining the validation score for the initial component estimation satisfies the validation score threshold, the PCB design computing entity 106 may determine a validation determination for the initial component estimation that indicates that the initial component estimation is validated. However, in response to determining the validation score for the initial component estimation fails to satisfy the validation score threshold, the PCB design computing entity 106 may determine a validation determination for the initial component estimation that indicates that the initial component estimation is not validated.

At step/operation 803, the PCB design computing entity 106 generates the first set of detected PCB components based at least in part on each validation determination for an initial component estimation of the plurality of initial component estimations. In some embodiments, the first set of detected PCB components includes each initial component estimation whose validation determination indicates that the initial component estimation is validated among the first set of detected PCB components.

Returning to FIG. 4, at step/operation 403, the PCB design computing entity 106 optionally performs a super-pixel segmentation using the plurality of initial component estimations and the non-direct-lighting image to generate a second set of detected PCB components. The super-pixel segmentation may be a computer-implemented process configured to determine detected PCB components based at least in part on clustering pixels of the non-direct-lighting image in accordance with per-pixel features.

In some embodiments, step/operation 403 can be performed according to the various steps/operations depicted in FIG. 15. At step/operation 1501, the PCB design computing entity 106 identifies one or more per-pixel features for each pixel of the non-direct-lighting image. Examples of per-pixel features for a pixel include RGB color features of the pixel as well as the (x, y) coordinate location features of the pixel. Although various embodiments of the present invention describe super-pixel segmentation using a non-direct-lighting image, a person of ordinary skill in the relevant technology will recognize that the super-pixel segmentation may be performed using one or more direct-lighting images and/or using a collection of images that includes one or more non-direct-light images and one or more direct-lighting images.

At step/operation 1502, the PCB design computing entity 106 determines one or more super-pixels of the non-direct-lighting image based at least in part on each per-pixel feature for a pixel of the non-direct-lighting image, where each super-pixel is a cluster of pixels. In some embodiments, to determine the one or more super-pixels, the PCB design computing entity 106 executes a clustering algorithm that processes each per-pixel feature for a pixel of the non-direct-lighting image to generate the super-pixels. The clustering algorithm may be initialized at a state where each pixel is considered a super-pixel. The clustering algorithm may execute until it satisfies a convergence condition, i.e., a convergence condition defined based at least in part on a number of iterations and/or based at least in part on whether pixels with similar per-pixel features have been merged.

At step/operation 1503, the PCB design computing entity 106 determines the second set of detected PCB components based at least in part on the one or more super-pixels and the one or more initial component estimations. In some embodiments, the PCB design computing entity 106 determines that each initial component estimation whose location has a threshold alignment (e.g., a ninety-percent alignment) with a super-pixel is adopted as one of the second set of detected PCB components.

Returning to FIG. 4, at step/operation 404, the PCB design computing entity 106 generates a bill of materials for the PCB based at least in part on the first set of detected PCB components and/or the second set of detected PCB components. In some embodiments, the PCB design computing entity 106 generates a bill of materials that includes each PCB component that is in the intersection of the first set of detected PCB components and the second set of detected PCB components. In some embodiments, the PCB design computing entity 106 generates a bill of materials that includes each PCB component that is in the union of the first set of detected PCB components and the second set of detected PCB components. In some embodiments, the PCB design computing entity 106 generates a bill of materials based at least in part on PCB components determined by combining the first set of detected PCB components and the second set of detected PCB components along with detected PCB components detected using a PCB component detection technique other than shadow detection segmentation and super-pixel segmentation.

At step/operation 405, the PCB design computing entity 106 refines a manufacturing process of the PCB based at least in part on the bill of materials. In some embodiments, the bill of materials is provided to a PCB design software to manufacture the PCB. In some embodiments, the bill of materials is used to perform hardware assurance (e.g., hardware trojan detection and/or manufacture validation) during the PCB manufacturing process. In some embodiments, the bill of materials is used to perform reverse-engineering on existing devices (e.g., legacy devices) in order to obtain information that can be used to refine the manufacturing process of the PCB. In some embodiments, the bill of materials is used to perform industrial assessment (e.g., cost estimation breakdown, quality assurance, benchmarking, and/or the like) of a PCB in order to refine the manufacturing process of the PCB. In some embodiments, the bill of materials is used to perform standardization across various PCBs, where the generated standards can be used to refine the manufacturing process of the PCB.

While various embodiments of the present invention have been described with respect to utilizing bills of materials for refining PCB manufacturing processes, a person of ordinary skill in the relevant technology will recognize that bills of materials may be used to perform tasks other than refining PCB manufacturing processes, such as to perform reverse-engineering on foreign PCB-related technologies, perform reverse-engineering on legacy PCB-related devices, perform hardware trojan detection of PCB-related technologies, perform hardware manufacturer validation of PCB-related technologies, perform industrial assessment of PCB-related technologies, perform standardization of PCB-related technologies, perform technology trend analysis of PCB-related technologies, and/or the like.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for printed circuit board (PCB) component estimation based at least in part on a plurality of PCB images comprising a non-direct-lighting image and one or more direct-lighting images, the computer-implemented method comprising:
   identifying, via one or more processors, a plurality of initial component estimations for the PCB;
   performing, via one or more processors, a shadow detection segmentation using the plurality of initial component estimations, the non-direct-lighting image, and the one or more direct-lighting images to generate a first set of detected PCB components;
   performing, via the one or more processors, a super-pixel segmentation using the plurality of initial component estimations and the non-direct-lighting image to generate a second set of detected PCB components; and
   generating, via the one or more processors, a bill of materials for the PCB based at least in part on the first set of detected PCB components and the second set of detected PCB components.

2. The computer-implemented method of claim 1, wherein performing the shadow detection segmentation comprises:
   determining, based at least in part on comparing the non-direct-lighting image and the one or more direct-lighting images, a shadow detection object indicating presence of one or more shadows in the one or more direct-lighting images;
   determining, based at least in part on the shadow detection object and for each initial component estimation of the plurality of initial component estimations, a validation score based at least in part on a count of the shadow detection object indicating presence of one or more shadows that correspond to the initial component estimation; and
   generating the first set of detected PCB components based at least in part on each validation score for an initial component estimation of the plurality of initial component estimations.

3. The computer-implemented method of claim 2, wherein:
   each direct-lighting image of the one or more direct-lighting images comprises one or more direct-lighting pixels;
   the non-direct-lighting image comprises one or more non-direct-lighting pixels; and
   determining the shadow detection object comprises:
      for each direct-lighting pixel of the one or more direct-lighting pixels of a direct-lighting image of the one or more direct-lighting images, determining a per-pixel shadow detection based at least in part on comparing a first darkness of the direct-lighting pixel and a second darkness of a corresponding non-direct-lighting pixel of the one or more non-direct-lighting pixels for the direct-lighting pixel;
      for each direct-lighting image of the one or more direct-lighting images, determining a per-image shadow detection object based at least in part on each per-pixel shadow detection for a direct-lighting pixel of the one or more direct-lighting pixels of the direct-lighting image; and
      generating the shadow detection object based at least in part on each per-image shadow detection object for a direct-lighting image of the one or more direct-lighting images.

4. The computer-implemented method of claim 2, wherein determining the validation score for an initial component estimation of the plurality of initial component estimations comprises:
   for each direct-lighting image of the one or more direct-lighting images,
      determining a per-image shadow detection object for the direct-lighting image based at least in part on the shadow detection object;
      determining a component coverage region for the initial component estimation within the direct-lighting image;
      determining a light source origination location within the direct-lighting image;
      determining a light source travel direction within the direct-lighting image;
      determining, within the component coverage region, a farthest distance location from the light source origination location;
      determining whether the per-image shadow detection object indicates presence of a qualified shadow for the initial component estimation within a distance threshold of the farthest distance location in the light source travel direction; and
      in response to determining that the per-image shadow detection object indicates presence of the qualified shadow for the initial component estimation, increasing the validation score of the initial component estimation.

5. The computer-implemented method of claim 2, wherein determining the validation score for an initial component estimation of the plurality of initial component estimations comprises:
   for each direct-lighting image of the one or more direct-lighting images,
      determining a per-image shadow detection object for the direct-lighting image based at least in part on the shadow detection object;
      determining a component coverage region for the initial component estimation within the direct-lighting image, wherein the component coverage region is based at least in part on the initial component estimation plus a distance within the initial component estimation;
      determining a line normal to a light source direction for the direct-lighting image;
      determining an origin of the component associated with the initial component estimation within the direct-lighting image;
      determining whether the per-image shadow detection object indicates presence of a qualified shadow within the component coverage region for the initial component estimation based at least in part on the line normal to the light source direction and the origin of the component; and in response to determining that the per-image shadow detection object indicates presence of the qualified shadow for the initial component estimation, increasing the validation score of the initial component estimation.

6. The computer-implemented method of claim 1, wherein generating the first set of detected PCB components comprises:

determining a validation score threshold based at least in part on a count of the one or more direct-lighting images;

for each initial component estimation of the plurality of initial component estimations, determining a validation determination based at least in part on whether the validation score for the initial component estimation satisfies the validation score threshold; and generating the first set of detected PCB components based at least in part on each validation determination for an initial component estimation of the plurality of initial component estimations.

7. The computer-implemented method of claim 1, wherein performing the super-pixel segmentation comprises:

for each pixel of one or more pixels of the non-direct-lighting image, determining one or more per-pixel features;

determining one or more super-pixels within the non-direct-lighting image based at least in part on the one or more per-pixel features of each pixel of the one or more pixels, wherein each super-pixel comprises a corresponding subset of the one or more pixels; and generating the second set of detected PCB components based at least in part on the one or more super-pixels.

8. The computer-implemented method of claim 7, wherein determining the one or more super-pixels comprises:

initializing each pixel of the one or more pixels of the non-direct-lighting image as a super-pixel of the one or more super-pixels;

performing, until a clustering convergence condition is satisfied, clustering iterations on the one or more pixels based at least in part on the one or more per-pixel features of each pixel of the one or more pixels to generate one or more pixel clusters; and determining the one or more super-pixels based at least in part on the one or more pixel clusters.

9. An apparatus for performing printed circuit board (PCB) component estimation, the apparatus comprising at least one processor and at least one memory including program code, the at least one memory and the program code configured to, with the processor, cause the apparatus to at least:

identify a plurality of initial component estimations for the PCB;

perform a shadow detection segmentation using the plurality of initial component estimations, a non-direct-lighting image, and one or more direct-lighting images to generate a first set of detected PCB components;

perform a super-pixel segmentation using the plurality of initial component estimations and the non-direct-lighting image to generate a second set of detected PCB components; and generate a bill of materials for the PCB based at least in part on the first set of detected PCB components and the second set of detected PCB components.

10. The apparatus of claim 9, wherein the at least one memory and the program code are configured to, with the at least one processor, cause the apparatus to perform the shadow detection segmentation by:

determining, based at least in part on comparing the non-direct-lighting image and the one or more direct-lighting images, a shadow detection object indicating presence of one or more shadows in the one or more direct-lighting images;

determining, based at least in part on the shadow detection object and for each initial component estimation of the plurality of initial component estimations, a validation score based at least in part on a count of the shadow detection object indicating presence of one or more shadows that correspond to the initial component estimation; and generating the first set of detected PCB components based at least in part on each validation score for an initial component estimation of the plurality of initial component estimations.

11. The apparatus of claim 10, wherein:

each direct-lighting image of the one or more direct-lighting images comprises one or more direct-lighting pixels;

the non-direct-lighting image comprises one or more non-direct-lighting pixels; and the at least one memory and the program code are configured to, with the at least one processor, cause the apparatus to determine the shadow detection object by:

for each direct-lighting pixel of the one or more direct-lighting pixels of a direct-lighting image of the one or more direct-lighting images, determining a per-pixel shadow detection based at least in part on comparing a first darkness of the direct-lighting pixel and a second darkness of a corresponding non-direct-lighting pixel of the one or more non-direct-lighting pixels for the direct-lighting pixel;

for each direct-lighting image of the one or more direct-lighting images, determining a per-image shadow detection object based at least in part on each per-pixel shadow detection for a direct-lighting pixel of the one or more direct-lighting pixels of the direct-lighting image; and generating the shadow detection object based at least in part on each per-image shadow detection object for a direct-lighting image of the one or more direct-lighting images.

12. The apparatus of claim 10, wherein the at least one memory and the program code are configured to, with the at least one processor, cause the apparatus to determine the validation score for an initial component estimation of the plurality of initial component estimations by:

for each direct-lighting image of the one or more direct-lighting images, determining a per-image shadow detection object for the direct-lighting image based at least in part on the shadow detection object;

determining a component coverage region for the initial component estimation within the direct-lighting image;

determining a light source origination location within the direct-lighting image;

determining a light source travel direction within the direct-lighting image;

determining, within the component coverage region, a farthest distance location from the light source origination location;

determining whether the per-image shadow detection object indicates presence of a qualified shadow for the initial component estimation within a distance threshold of the farthest distance location in the light source travel direction; and in response to determining that the per-image shadow detection object indicates presence of the qualified shadow for the initial component estimation, increasing the validation score of the initial component estimation.

13. The apparatus of claim 10, wherein the at least one memory and the program code are configured to, with the at least one processor, cause the apparatus to determine the validation score for an initial component estimation of the plurality of initial component estimations comprises:

for each direct-lighting image of the one or more direct-lighting images, determining a per-image shadow detection object for the direct-lighting image based at least in part on the shadow detection object;

determining a component coverage region for the initial component estimation within the direct-lighting image, wherein the component coverage region is based at least in part on the initial component estimation plus a distance within the initial component estimation;

determining a line normal to a light source direction for the direct-lighting image;

determining an origin of the component associated with the initial component estimation within the direct-lighting image;

determining whether the per-image shadow detection object indicates presence of a qualified shadow within the component coverage region for the initial component estimation based at least in part on the line normal to the light source direction and the origin of the component; and in response to determining that the per-image shadow detection object indicates presence of the qualified shadow for the initial component estimation, increasing the validation score of the initial component estimation.

14. The apparatus of claim 9, wherein the at least one memory and the program code are configured to, with the at least one processor, cause the apparatus to generate the first set of detected PCB components by:

determining a validation score threshold based at least in part on a count of the one or more direct-lighting images;

for each initial component estimation of the plurality of initial component estimations, determining a validation determination based at least in part on whether the validation score for the initial component estimation satisfies the validation score threshold; and generating the first set of detected PCB components based at least in part on each validation determination for an initial component estimation of the plurality of initial component estimations.

15. The apparatus of claim 9, wherein the at least one memory and the program code are configured to, with the at least one processor, cause the apparatus to perform the super-pixel segmentation by:

for each pixel of one or more pixels of the non-direct-lighting image, determining one or more per-pixel features, wherein determining the one or more per-pixel features comprises:

initializing each pixel of the one or more pixels of the non-direct-lighting image as a super-pixel of the one or more super-pixels, performing, until a clustering convergence condition is satisfied, clustering iterations on the one or more pixels based at least in part on the one or more per-pixel features of each pixel of the one or more pixels to generate one or more pixel clusters, and determining the one or more super-pixels based at least in part on the one or more pixel clusters;

determining one or more super-pixels within the non-direct-lighting image based at least in part on the one or more per-pixel features of each pixel of the one or more pixels, wherein each super-pixel comprises a corresponding subset of the one or more pixels; and generating the second set of detected PCB components based at least in part on the one or more super-pixels.

16. A computer program product for performing printed circuit board (PCB) component estimation, the computer program product comprising at least one non-transitory computer-readable storage medium having computer-readable program code portions stored therein, the computer-readable program code portions configured to:

identify a plurality of initial component estimations for the PCB;

perform a shadow detection segmentation using the plurality of initial component estimations, a non-direct-lighting image, and one or more non-direct-lighting images to generate a first set of detected PCB components;

perform a super-pixel segmentation using the plurality of initial component estimations and the non-direct-lighting image to generate a second set of detected PCB components; and generate a bill of materials for the PCB based at least in part on the first set of detected PCB components and the second set of detected PCB components.

17. The computer program product of claim 16, wherein the instructions are configured to cause the one or more computer processors to at least perform operations configured to perform the shadow detection segmentation by:

determining, based at least in part on comparing the non-direct-lighting image and the one or more direct-lighting images, a shadow detection object indicating presence of one or more shadows in the one or more direct-lighting images;

determining, based at least in part on the shadow detection object and for each initial component estimation of the plurality of initial component estimations, a validation score based at least in part on a count of the shadow detection object indicating presence of one or more shadows that correspond to the initial component estimation; and generating the first set of detected PCB components based at least in part on each validation score for an initial component estimation of the plurality of initial component estimations.

18. The computer program product of claim 17, wherein the instructions are configured to cause the one or more computer processors to at least perform operations configured to determine the validation score for an initial component estimation of the plurality of initial component estimations by:

for each direct-lighting image of the one or more direct-lighting images,
- determining a per-image shadow detection object for the direct-lighting image based at least in part on the shadow detection object;
- determining a component coverage region for the initial component estimation within the direct-lighting image;
- determining a light source origination location within the direct-lighting image;
- determining a light source travel direction within the direct-lighting image;
- determining, within the component coverage region, a farthest distance location from the light source origination location;
- determining whether the per-image shadow detection object indicates presence of a qualified shadow for the initial component estimation within a distance threshold of the farthest distance location in the light source travel direction; and
- in response to determining that the per-image shadow detection object indicates presence of the qualified shadow for the initial component estimation, increasing the validation score of the initial component estimation.

19. The computer program product of claim 17, wherein the instructions are configured to cause the one or more computer processors to at least perform operations configured to determine the validation score for an initial component estimation of the plurality of initial component estimations comprises:

for each direct-lighting image of the one or more direct-lighting images,
- determining a per-image shadow detection object for the direct-lighting image based at least in part on the shadow detection object;
- determining a component coverage region for the initial component estimation within the direct-lighting image, wherein the component coverage region is based at least in part on the initial component estimation plus a distance within the initial component estimation;
- determining a line normal to a light source direction for the direct-lighting image;
- determining an origin of the component associated with the initial component estimation within the direct-lighting image;
- determining whether the per-image shadow detection object indicates presence of a qualified shadow within the component coverage region for the initial component estimation based at least in part on the line normal to the light source direction and the origin of the component; and
- in response to determining that the per-image shadow detection object indicates presence of the qualified shadow for the initial component estimation, increasing the validation score of the initial component estimation.

20. The computer program product of claim 16, wherein the instructions are configured to cause the one or more computer processors to at least perform operations configured to generate the first set of detected PCB components by:
- determining a validation score threshold based at least in part on a count of the one or more direct-lighting images;
- for each initial component estimation of the plurality of initial component estimations, determining a validation determination based at least in part on whether the validation score for the initial component estimation satisfies the validation score threshold; and
- generating the first set of detected PCB components based at least in part on each validation determination for an initial component estimation of the plurality of initial component estimations.

\* \* \* \* \*